United States Patent
Luo

(10) Patent No.: US 12,494,031 B2
(45) Date of Patent: Dec. 9, 2025

(54) DATA IDENTIFICATION METHOD AND APPARATUS

(71) Applicant: Tencent Cloud Computing (Beijing) Co., Ltd., Beijing (CN)

(72) Inventor: Zekun Luo, Beijing (CN)

(73) Assignee: TENCENT CLOUD COMPUTING (BEIJING) CO., LTD., Beijing (CN)

( * ) Notice: Subject to any disclaimer, the term of this patent is extended or adjusted under 35 U.S.C. 154(b) by 374 days.

(21) Appl. No.: 18/119,563

(22) Filed: Mar. 9, 2023

(65) Prior Publication Data

US 2023/0215125 A1 Jul. 6, 2023

Related U.S. Application Data

(63) Continuation of application No. PCT/CN2021/107122, filed on Jul. 19, 2021.

(30) Foreign Application Priority Data

May 26, 2021 (CN) .......................... 202110579893.X

(51) Int. Cl.
*G06V 10/00* (2022.01)
*G06V 10/22* (2022.01)
(Continued)

(52) U.S. Cl.
CPC ............ *G06V 10/225* (2022.01); *G06V 10/40* (2022.01); *G06V 10/759* (2022.01);
(Continued)

(58) Field of Classification Search
CPC ...... G06V 10/82; G06V 10/25; G06V 10/225; G06V 10/761; G06V 10/40; G06V 10/759;
(Continued)

(56) References Cited

U.S. PATENT DOCUMENTS 5,497,338 A * 3/1996 Miyake ................. H04N 19/53
348/E5.066
9,336,457 B2 * 5/2016 Raykar ................ G06V 10/757
(Continued)

FOREIGN PATENT DOCUMENTS

CN 108960266 A 12/2018
CN 109543641 A 3/2019
(Continued)

OTHER PUBLICATIONS

Office Action dated Aug. 14, 2024 in corresponding Chinese Patent Application No. 202110579893.X, 15 pages.
(Continued)

*Primary Examiner* — Amir Alavi
(74) *Attorney, Agent, or Firm* — Crowell & Moring LLP

(57) ABSTRACT

This disclose relates to a data processing method and apparatus. The method includes: acquiring a first prediction region in a target image, the first prediction region being a prediction region corresponding to a maximum prediction category probability in N prediction regions in the target image, a prediction category probability being a probability that an object in a prediction region belongs to a prediction object category; determining a coverage region jointly covered by a second prediction region and the first prediction region; the second prediction region being a prediction region other than the first prediction region in the N prediction regions; and determining a target prediction region in the prediction regions based on an area of the coverage region and a similarity associated with the second prediction region, the similarity being for indicating a similarity between an object in the second prediction region and an object in the first prediction region.

20 Claims, 9 Drawing Sheets

(51) Int. Cl.
*G06V 10/40* (2022.01)
*G06V 10/74* (2022.01)
*G06V 10/75* (2022.01)
*G06V 10/764* (2022.01)
*G06V 10/774* (2022.01)
*G06V 10/776* (2022.01)
*G06V 10/82* (2022.01)

(52) U.S. Cl.
CPC .......... *G06V 10/761* (2022.01); *G06V 10/764* (2022.01); *G06V 10/774* (2022.01); *G06V 10/776* (2022.01); *G06V 10/82* (2022.01)

(58) Field of Classification Search
CPC .. G06V 10/774; G06V 10/776; G06V 10/764; G06N 3/02; G06N 3/08; G06N 3/042; G06N 3/045; G06N 3/047; G06N 3/082; G06N 3/092; G06N 3/0475; G06N 3/0454; G06N 3/0464; G06F 18/22; G06F 18/214; G06F 18/2415
See application file for complete search history.

(56) References Cited

U.S. PATENT DOCUMENTS

| | | | | |
|---|---|---|---|---|
| 9,495,619 | B2* | 11/2016 | Tang | G06N 3/084 |
| 11,259,043 | B2* | 2/2022 | Lee | H04N 19/119 |
| 11,669,990 | B2* | 6/2023 | Peng | G06V 10/809 |
| | | | | 382/103 |
| 11,995,821 | B2* | 5/2024 | Jiang | G06T 7/11 |
| 12,081,737 | B2* | 9/2024 | Sun | H04N 19/137 |
| 12,192,444 | B2* | 1/2025 | Sun | H04N 19/105 |
| 12,225,187 | B2* | 2/2025 | Sun | H04N 19/137 |
| 12,288,067 | B2* | 4/2025 | Bouzguarrou | G06F 9/3861 |
| 2018/0018587 | A1* | 1/2018 | Kobayashi | G06N 20/00 |
| 2023/0215125 | A1* | 7/2023 | Luo | G06V 10/774 |
| | | | | 382/159 |

FOREIGN PATENT DOCUMENTS

| | | |
|---|---|---|
| CN | 110472640 A | 11/2019 |
| CN | 110852321 A | 2/2020 |
| CN | 111008656 A | 4/2020 |
| CN | 111260927 A | 6/2020 |
| CN | 111626350 A | 9/2020 |
| CN | 111738231 A | 10/2020 |
| CN | 112749726 A | 5/2021 |
| WO | WO 2020/244653 A1 | 12/2020 |

OTHER PUBLICATIONS

International Search Report issued Feb. 24, 2022 in corresponding (PCT) Application No. PCT/CN2021/107122.

* cited by examiner

DATA IDENTIFICATION METHOD AND APPARATUS

RELATED APPLICATION

This application is a continuation application of PCT Patent Application No. PCT/CN2021/107122, filed on Jul. 19, 2021, which claims priority to Chinese Patent Application No. 202110579893X, entitled "DATA IDENTIFICATION METHOD, APPARATUS, AND DEVICE, AND READABLE STORAGE MEDIUM" filed on May 26, 2021, wherein the content of the above-referenced applications is incorporated herein by reference in its entirety.

FIELD OF THE TECHNOLOGY

Embodiments of this disclosure relate to the field of computer technologies, and in particular, to a data identification method, apparatus, and device, and a readable storage medium.

BACKGROUND OF THE DISCLOSURE

Object detection is a very important computer vision task, and an objective thereof is to identify a location of an object in an image and a category of the object. Currently, a process of entire object detection is as follows: Detection boxes corresponding to all possible objects in an image and a prediction object category corresponding to each detection box are determined by using a convolutional neural network. The detection box is also referred to as a prediction box, and the prediction object category is a category to which an object in a corresponding detection box belongs. Then, based on a post-processing method of non-maximum suppression (NMS), an optimal detection box, that is, a target detection box, of each object is determined in these detection boxes.

For the post-processing method of non-maximum suppression, a main processing procedure is: classifying detection boxes according to prediction object categories of the detection boxes, and sorting detection boxes belonging to the same category according to confidences; then, calculating an overlapping area between the first ranked detection box and each of other detection boxes, and suppressing (for example, deleting) a detection box whose intersection over union (IOU) is greater than a specific threshold; and finally, obtaining a detection box with a highest confidence of each category, that is, a target detection box.

However, in the current post-processing method of non-maximum suppression based on the overlapping area, in a case in which two (or more) objects of the same category in an image are located closely, a problem of error suppression likely occurs. In a case in which locations of objects in an image are close, detection boxes corresponding to these objects have a relatively large overlapping area, and an intersection over union thereof is likely to be greater than the threshold, and thus error suppression exists.

SUMMARY

Embodiments of this disclosure provide a data identification method, apparatus, and device, and a non-transitory computer readable storage medium, so as to improve accuracy of object identification in an image.

An aspect of the embodiments of this disclosure provides a data identification method, including:

acquiring a first prediction region in a target image, the first prediction region being a prediction region corresponding to a maximum prediction category probability in N prediction regions in the target image, a prediction category probability being a probability that an object in a prediction region belongs to a prediction object category, and prediction object categories of objects comprised in the N prediction regions being the same; N being a positive integer greater than 1;

determining a coverage region jointly covered by a second prediction region and the first prediction region; the second prediction region being a prediction region other than the first prediction region in the N prediction regions; and determining a target prediction region in the N prediction regions based on an area of the coverage region and a similarity associated with the second prediction region, the similarity being for indicating a similarity between an object in the second prediction region and an object in the first prediction region, and the target prediction region being a region in which an object of the target image is located.

An aspect of the embodiments of this disclosure provides a data identification apparatus, including a memory operable to store computer-readable instructions and a processor circuitry operable to read the computer-readable instructions. When executing the computer-readable instructions, the processor circuitry is configured to:

acquire a first prediction region in a target image, the first prediction region being a prediction region corresponding to a maximum prediction category probability in N prediction regions in the target image, a prediction category probability being a probability that an object in a prediction region belongs to a prediction object category, and prediction object categories of objects comprised in the N prediction regions being the same, N being a positive integer greater than 1;

determine a coverage region jointly covered by a second prediction region and the first prediction region; the second prediction region being a prediction region other than the first prediction region in the N prediction regions; and determine a target prediction region in the N prediction regions based on an area of the coverage region and a similarity associated with the second prediction region, the similarity being for indicating a similarity between an object in the second prediction region and an object in the first prediction region, and the target prediction region being a region in which an object of the target image is located.

An aspect of the embodiments of this disclosure provides another data identification method, including:

determining, with a sample image identification model and based on a sample training image, K sample prediction regions in the sample training image, a sample prediction object category corresponding to a sample object in a sample prediction region, and a prediction classification result between every two sample object tag features in K sample object tag features, the K sample object tag features being sample object tag features corresponding to sample objects in the K sample prediction regions, and K being a positive integer;

acquiring a real region corresponding to the sample prediction region and a real object category corresponding to the real region; and adjusting the sample image identification model to obtain an image identification model based on the K sample prediction regions, the real region corresponding to the sample prediction region, the real object category corresponding to the real region, the sample prediction object category corresponding to the sample object in the sample prediction region, and the prediction classification result and a real classification result between every two sample object tag features in the K sample object tag features, the image identification model being for identifying N prediction regions in a target image, prediction object categories corresponding to objects in the N prediction regions, and prediction object tag features respectively corresponding to each of the N prediction regions, the N prediction regions, the prediction object categories corresponding to the objects in the N prediction regions, and the prediction object tag features respectively corresponding to each of the N prediction regions being for determining a target prediction region in the N prediction regions, and prediction object categories corresponding to the N prediction regions being the same, and N being a positive integer greater than 1.

An aspect of the embodiments of this disclosure provides a non-transitory computer readable storage medium, the computer readable storage medium storing a computer program, the computer program including program instructions, and the program instructions being executed by a processor to perform the method in the embodiments of this disclosure.

In the embodiments of this disclosure, after the N prediction regions in the target image are obtained, when the target prediction region is selected in the N prediction regions, the target prediction region can be jointly determined based on the overlapping region between the first prediction region and the second prediction region (the coverage region jointly covered), and the similarity between the object in the first prediction region and the object in the second prediction region. It is to be understood that the prediction region may be understood as a detection box of an object in the target image. In the embodiments of this disclosure, when a final detection box is determined, in addition to considering an overlapping region between detection boxes, a similarity between objects in the detection boxes is further considered, and a target detection box jointly determined by the two is more accurate. In conclusion, in the embodiments of this disclosure, accuracy of object identification in an image can be improved.

BRIEF DESCRIPTION OF THE DRAWINGS

To describe the technical solutions in the implementations of the present disclosure or in the related art more clearly, the following briefly describes the accompanying drawings needed for describing the implementations or the related art. Apparently, the accompanying drawings in the following description show merely some implementations of the present disclosure, and a person of ordinary skill in the art can still derive other drawings from these accompanying drawings without creative efforts.

DESCRIPTION OF EMBODIMENTS

The technical solutions in embodiments of this disclosure are clearly and completely described in the following with reference to the accompanying drawings in the embodiments of this disclosure. Apparently, the described embodiments are merely some rather than all of the embodiments of this disclosure. All other embodiments obtained by a person of ordinary skill in the art based on the embodiments of this disclosure without making creative efforts shall fall within the protection scope of this application.

Figure 1:
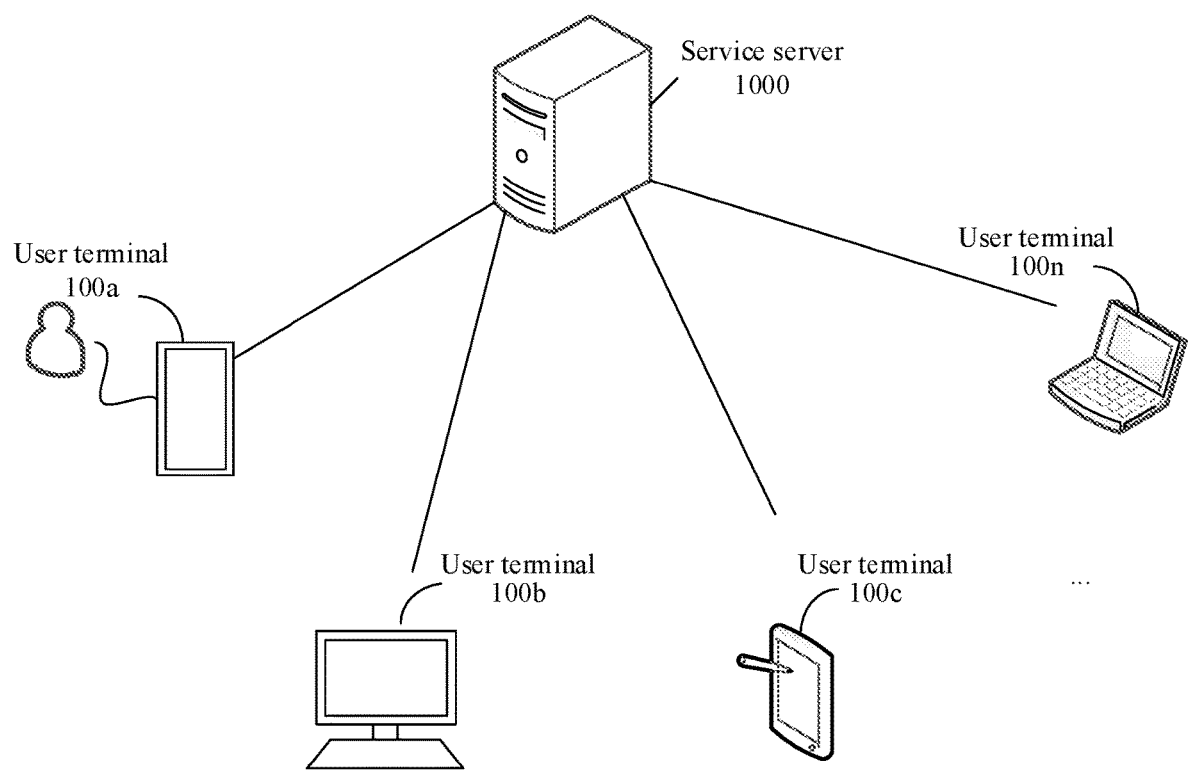
FIG. 1 is a network architecture diagram according to an embodiment of this disclosure.

FIG. 1 is a diagram of a network architecture according to an embodiment of this disclosure. As shown in FIG. 1, the network architecture may include a service server 1000 and a user terminal cluster. The user terminal cluster may include a plurality of user terminals. As shown in FIG. 1, the user terminal cluster may specifically include a user terminal 100*a*, a user terminal 100*b*, a user terminal 100*c*, . . . , and a user terminal 100*n*. As shown in FIG. 1, a user terminal 100*a*, a user terminal 100*b*, a user terminal 100*c*, . . . , and a user terminal 100*n* may separately establish a network connection to the service server 1000, so that each user terminal can exchange data with the service server 1000 by using the network connection, so that the service server 1000 can receive service data from each user terminal.

Each user terminal shown in FIG. 1 may be installed with a target application. When the target application runs in each user terminal, data exchange may be performed with the service server 1000 shown in FIG. 1. The target application may include an application that has a function of displaying data information such as a character, an image, an audio, and a video. For example, the application may be an image identification type application, and may be used by a user to upload a picture, view locations of objects in the picture, and perform subsequent processing according to the locations of these objects. For example, the image identification type application is a watermark identification application, and may be used by a user to upload a picture and check whether a sensitive watermark or a violation watermark exists in the picture, and when present, mark a location of the sensitive watermark or the violation watermark (for example, the location of the sensitive watermark or the violation watermark may be framed). The application may alternatively be an image classification application, and may be used by a user to upload a picture, and view an object category (for example, an elephant, a tiger, or a lark) to which an object (for example, a person or an animal) included in the picture belongs. The application may alternatively be a video detection application, and may be used by a user to upload a video, and detect whether there is a violation watermark or a sensitive watermark in a video frame of the video.

The service server 1000 in this embodiment of this disclosure may collect service data from a background of these applications, for example, the service data may be an image uploaded by a user or a video uploaded by a user. According to the collected service data, the service server 1000 may determine an object category to which the object included in the service data belongs and location information (that is, a detection box) of the object in the service data (image or video). Further, the service server 1000 may transmit the object category and the location information to the user terminal. The user may determine, by using the user terminal, the object category to which the object in the video frame of the image or video belongs, and view the location information of the object in the image or the video frame of the video. The user may perform subsequent processing according to the object category and the location information that are viewed. For example, if the user uploads a video A, and the service server 1000 detects that a sensitive watermark exists at a location of a video frame A of the video A, the service server 1000 may return a detection result to a user terminal corresponding to the user, and the user may view the detection result on a display page of the user terminal. Subsequently, the user may delete the sensitive watermark in the video A by using location information returned by the service server 1000 (the location of the video frame A in the video A) and an object category (the sensitive watermark), so as to ensure that the video A is legal.

The service server 1000 shown in FIG. 1 may be a server corresponding to the target application. The service server may be an independent physical server, or may be a server cluster or a distributed system formed by multiple physical servers, or may be a cloud server that provides a basic cloud computing service such as a cloud service, a cloud database, cloud computing, a cloud function, cloud storage, a network service, cloud communication, a middleware service, a domain name service, a security service, a content delivery network (CDN), a blockchain network, big data, and an artificial intelligence platform.

For ease of understanding, in this embodiment of this disclosure, one user terminal may be selected from multiple user terminals as a target user terminal. The target user terminal may include: an intelligent terminal that carries a function of displaying and playing data information, such as a smartphone, a tablet computer, and a desktop computer. For example, in this embodiment of this disclosure, the user terminal 100a shown in FIG. 1 may be used as the target user terminal, and the target user terminal may be integrated with the foregoing target application. In this case, the target user terminal may exchange data with the service server 1000.

For example, when a user uses a target application (such as a video detection application) in a user terminal, the service server 1000 may detect and collect, by using the user terminal, a video uploaded by the user, and the service server 1000 may determine whether a target object (such as a person, an animal, or a sensitive watermark) exists in the video. If a target object exists in the video, the service server 1000 determines an object category to which the target object belongs, location information of the target object in the video, and returns the object category and the location information to the user terminal. The user may view the object category and the location information on a display page of the user terminal, and perform subsequent processing according to the object category and the location information.

It may be understood that the user terminal may also detect and collect service data (such as an image or a video), and determine an object category to which an object included in the service data belongs and location information of the object in the service data (image or video). Instead of relying on the service server, after the user terminal determines the object category to which the object included in the service data belongs and the location information of the object in the service data, the user may view, on the display page of the user terminal, the object category and the location information that are determined by the user terminal.

Figure 4:
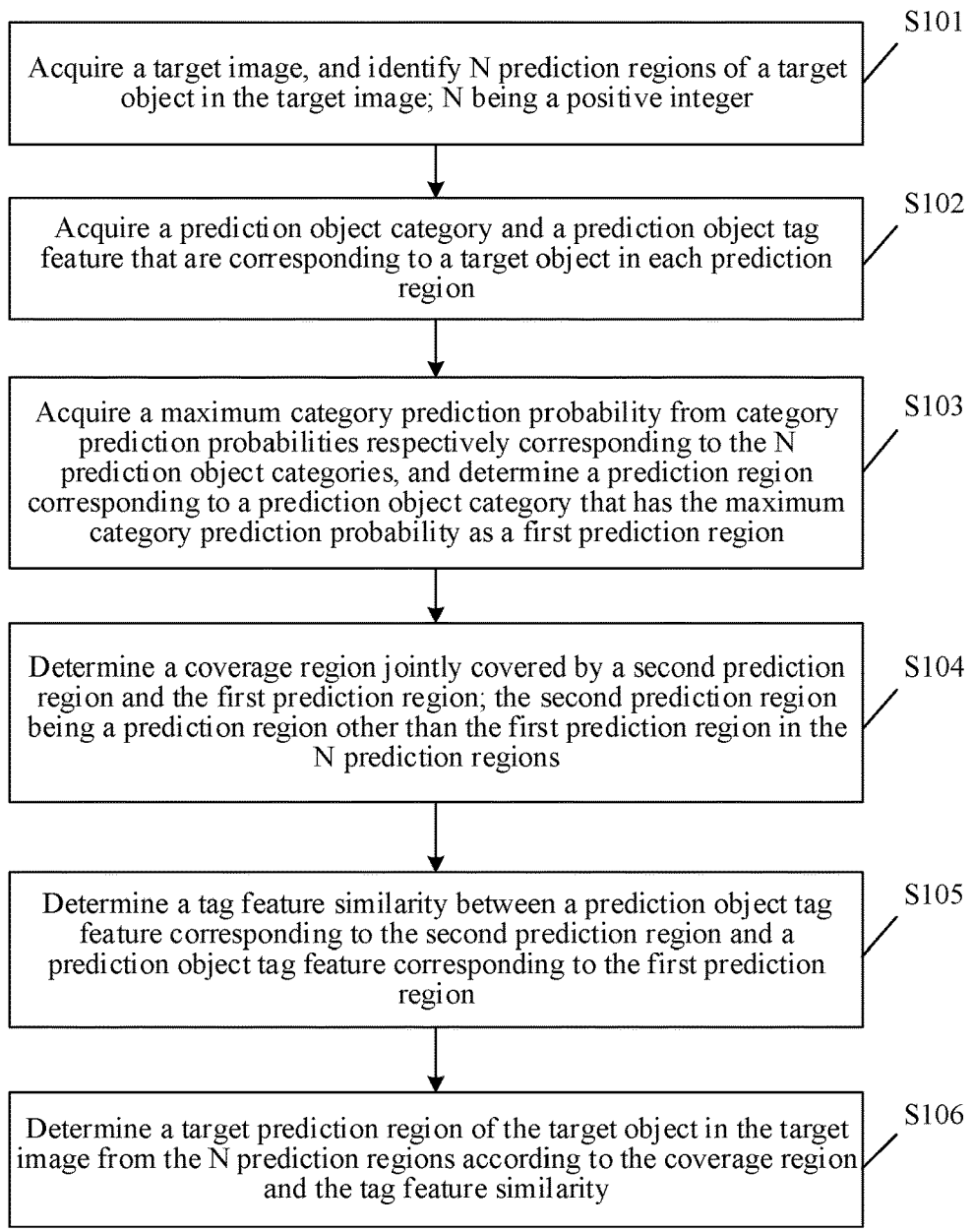
FIG. 4 is a method flowchart of a data identification method according to an embodiment of this disclosure.

It may be understood that, for a specific implementation in which the service server 1000 or the user terminal determines the object category to which the target object belongs and the location information of the target object in the image (or the video frame), references may be made to the description in the subsequent embodiment corresponding to FIG. 4.

It may be understood that the method provided in this embodiment of this disclosure may be performed by a computer device, and the computer device includes but is not limited to a user terminal or a service server. The user terminal and the service server may be directly or indirectly connected in a wired or wireless communication manner, which is not limited in this application.

Figure 2:
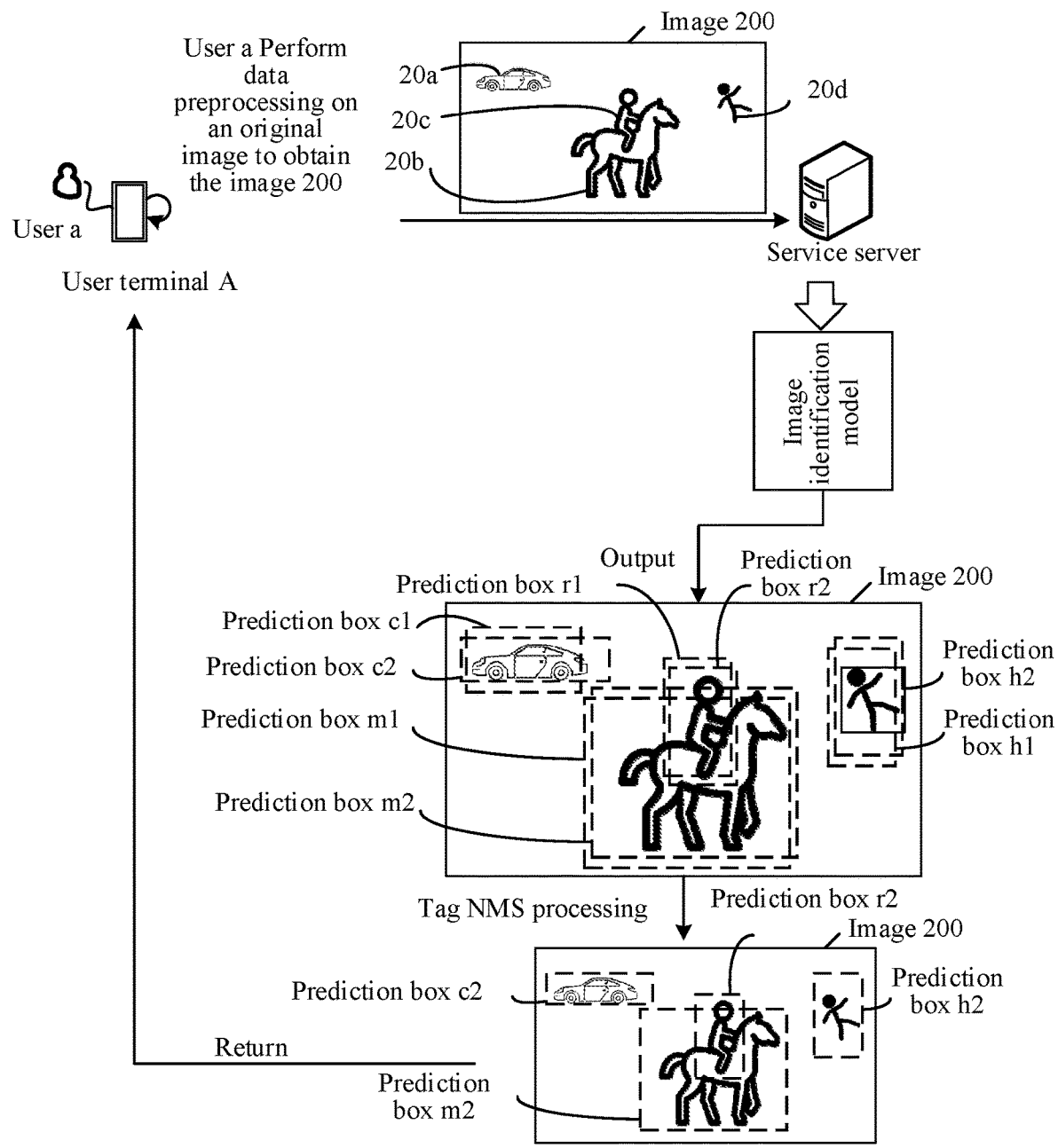
FIG. 2 is a schematic diagram of a scenario of identifying location information of a target object according to an embodiment of this disclosure.

For ease of understanding, refer to FIG. 2 together. FIG. 2 is a schematic diagram of a scenario of identifying location information of a target object according to an embodiment of this disclosure. The service server shown in FIG. 2 may be the service server 1000, and the user terminal A shown in FIG. 2 may be any user terminal selected from the user terminal cluster in the embodiment corresponding to FIG. 1. For example, the user terminal may be the user terminal 100a.

As shown in FIG. 2, a user may upload an original image in a target application of the user terminal A, and the user terminal A may perform data preprocessing (for example, performing data enhancement processing and image normalization processing on the original image) on the original image to obtain an image 200, where the image 200 includes an object 20a, an object 20b, an object 20c, and an object 20d. The user terminal A may transmit the image 200 to the service server. Subsequently, after receiving the image 200, the service server may input the image 200 into an image identification model deployed in the service server. By using the image identification model, a prediction box (that is, a prediction region) of each object in the image 200, a prediction object category and a prediction object tag feature of each object included in the prediction box may be determined.

The user terminal may alternatively transmit the original image to the service server, and the service server may perform data preprocessing on the original image, and input an image obtained after data preprocessing into an image identification model, so as to determine, by using the image identification model, a prediction box of each object in the image 200, a prediction object category and a prediction object tag feature of each object included in the prediction box.

As shown in FIG. 2, the image identification model may output a prediction box of each object in the image 200, an object existence probability corresponding to each prediction box, multiple initial prediction probabilities corresponding to each prediction box, and an object tag feature corresponding to each prediction box. The object existence probability may be used for representing a probability that an object exists in the prediction box outputted by the image identification model, and the multiple initial prediction probabilities are probabilities that an object in the prediction box belongs to multiple categories. When the object existence probability is greater than a certain threshold, it may be considered that an object exists in the prediction box, and a category of the object that exists in the prediction box may be further determined by using multiple initial prediction probabilities corresponding to the prediction box. The prediction object tag feature may be a feature that is of an object existing in the prediction box and that is outputted by the image identification model (for example, if an object category in a prediction box is a person, hair of the person is red, and clothing is blue, "hair is red, and clothing is blue" may be used as a prediction object tag feature of the prediction box).

An object 20c in the image 200 is used as an example. Prediction boxes of the object 20c outputted by the image identification model are a prediction box r1 and a prediction box r2. In addition, the image identification model may further output object existence probabilities respectively corresponding to the prediction box r1 and the prediction box r2, and may further output multiple initial prediction probabilities and prediction object tag features respectively corresponding to the prediction box r1 and the prediction box r2. The object existence probability of the prediction box r1 is 0.9 (greater than an object existence probability threshold 0.8), and the multiple initial prediction probabilities of the prediction box r1 are (0.6, 0.4). An object category corresponding to the initial prediction probability 0.6 is a person, and an object category corresponding to the initial prediction probability 0.4 is an animal. Therefore, because the initial prediction probability 0.6 is greater than the initial prediction probability 0.4, the prediction object category of the object 20c included in the prediction box r1 may be determined as a person. The object existence probability of the prediction box r2 is 0.95, and the multiple initial prediction probabilities of the prediction box r2 are (0.8, 0.2). An object category corresponding to the initial prediction probability 0.8 is a person, and an object category corresponding to the initial prediction probability 0.2 is an animal. Therefore, because the initial prediction probability 0.8 is greater than the initial prediction probability 0.2, the prediction object category of the object 20c included in the prediction box r2 may be determined as a person. Similarly, it may be determined that in the image 200, a prediction object category of the object 20a included in the prediction box c1 is a vehicle (a corresponding initial prediction probability is 0.7), and a prediction object category of the object 20a included in the prediction box c2 is a vehicle (a corresponding initial prediction probability is 0.8). It may be determined that in the image 200, a prediction object category of the prediction box m1 is an animal (a corresponding initial prediction probability is 0.75), and a prediction object category of the prediction box m2 is an animal (a corresponding initial prediction probability is 0.85). It may be determined that in the image 200, a prediction object category of the prediction box h1 is a person (a corresponding initial prediction probability is 0.7), and a prediction object category of the prediction box h2 is a person (a corresponding initial prediction probability is 0.75).

Further, the service server may perform tag non-maximum suppression (Tag NMS) on the prediction box outputted by the image identification model, so as to determine a target prediction box (that is, a target prediction region) corresponding to each object in the image 200. A specific method may be as follows: The service server may classify prediction boxes in the image 200 according to a prediction object category of an object included in each prediction box (subsequently referred to as a prediction object category respectively corresponding to each prediction box). For example, if the prediction object categories of both the prediction box c1 and the prediction box c2 in FIG. 2 are vehicles, the prediction box c1 and the prediction box c2 may be classified into one category. If the prediction object categories of the prediction box r1, the prediction box r2, the prediction box h1, and the prediction box h2 are all persons, the prediction box r1, the prediction box r2, the prediction box h1, and the prediction box h2 may be classified into one category. If the prediction object categories of both the prediction box m1 and the prediction box m2 are animals, the prediction box m1 and the prediction box m2 may be classified into one category. Then, the service server may perform sorting according to a category prediction probability corresponding to a prediction box in each category, and perform Tag NMS processing according to a sorting result, to obtain a target prediction box of each object.

The following uses the prediction box r1, the prediction box r2, the prediction box h1, and the prediction box h2 whose prediction object categories are all persons as examples to perform Tag NMS processing on the prediction box to obtain a specific manner of the target prediction box of each object. First, the category prediction probabilities respectively corresponding to the prediction box r1, the prediction box r2, the prediction box h1, and the prediction box h2 may be obtained, and the prediction boxes are sorted according to the category prediction probabilities. Because the prediction object category "person" corresponding to the prediction box r1 is determined by using the initial prediction probability 0.6, the category prediction probability corresponding to the prediction box r1 may be 0.6. Similarly, it may be determined that the category prediction probability corresponding to the prediction box r2 is 0.8, the category prediction probability corresponding to the prediction box h1 is 0.7, and the category prediction probability corresponding to the prediction box h2 is 0.75. Then, the prediction box r1, the prediction box r2, the prediction box h1, and the prediction box h2 may be sorted in descending order of their category prediction probabilities to obtain a sorted sequence {prediction box r2, prediction box h2, prediction box h1, prediction box r1}.

Further, the prediction box r2 at the first sequence location of the sequence {prediction box r2, prediction box h2, prediction box h1, prediction box r1} (that is, a prediction box of a maximum category prediction probability) may be used as a first prediction box (that is, the first prediction region). Then, each second prediction box (including the prediction box h2, the prediction box h1, and the prediction box r1) may be separately compared with the first prediction box to determine an overlapping area (that is, an area of an overlapping region) between the second prediction box and the first prediction box r2. Then, prediction object tag features corresponding to the prediction box r2, the prediction box h2, the prediction box h1, and the prediction box r1 may be obtained, and a tag feature similarity between the prediction box h2 and the prediction box r2, a tag feature similarity between the calculation prediction box h1 and the prediction box r2, and a tag feature similarity between the calculation prediction box r1 and the prediction box r2 may be calculated. For a specific implementation of calculating the tag feature similarity, refer to description in subsequent embodiment corresponding to FIG. 4.

Figure 3:
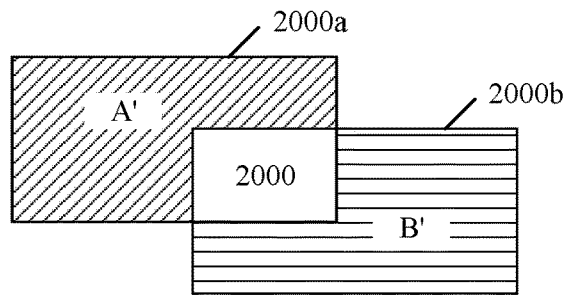
FIG. 3 is a schematic diagram of determining an intersection over union (IOU) according to an embodiment of this disclosure.

Then, according to an overlapping area between every two prediction boxes (between any second prediction box and the first prediction box), an intersection over union (IOU) between two prediction boxes may be determined. For ease of understanding the IOU between the two prediction boxes, refer to FIG. 3. FIG. 3 is a schematic diagram of determining an intersection over union (IOU) according to an embodiment of this disclosure. As shown in FIG. 3, the prediction boxes may include a prediction box 2000*a* and a prediction box 2000*b*, and there is an overlapping region 2000 between the prediction box 2000*a* and the prediction box 2000*b*. An area corresponding to the overlapping region 2000 may be understood as an overlapping area between the prediction box 2000*a* and the prediction box 2000*b*. A region A' in the prediction box 2000*a* may be understood as a part not covered by the prediction box 2000*b* except the region 2000. Similarly, a region B' in the prediction box 20000*b* may be understood as a part not covered by the prediction box 2000*a* except the region 2000. A union result between the region A' and the region B' (for example, adding the region A' and the region B' to obtain A'∪B') may be obtained, and a ratio (that is, $$\frac{A' \cap B'}{A' \cup B'})$$

between the overlapping area (region 2000, that is, A'∩B') and the union result may be determined as an IOU between the prediction box 2000*a* and the prediction box 2000*b*.

It is to be understood that it may be jointly determined, according to an IOU and a tag feature similarity between every two prediction boxes (between any second prediction box and the first prediction box), whether to retain the second prediction box (only when an IOU between a second prediction box and the target prediction box is greater than a proportion threshold and the tag feature similarity is also greater than a similarity threshold), the second prediction box is deleted; otherwise, it is retained), and then the target prediction box of each object in the image 200 is determined by the retained prediction box. For example, using the prediction box r1 and the prediction box r2 as an example, it may be determined that an IOU between the prediction box r1 and the prediction box r2 is 0.9, and the IOU is greater than the proportion threshold (for example, 0.67). It may be obtained that a tag feature similarity between the prediction box r1 and the prediction box r2 is 0.98, and the tag feature similarity is greater than the similarity threshold (0.5). Because the IOU is greater than the proportion threshold and the tag feature similarity is also greater than the similarity threshold, the prediction box r1 may be deleted. Similarly, using the prediction box h2 and the prediction box r2 as an example, it may be determined that an IOU between the prediction box h2 and the prediction box r2 is 0, and the IOU is less than the proportion threshold (for example, 0.67). It may be obtained that a tag feature similarity between the prediction box h2 and the prediction box r2 is 0.23, and the tag feature similarity is less than the similarity threshold (0.5). Because the IOU is less than the proportion threshold and the tag feature similarity is also less than the similarity threshold, the prediction box h2 may be retained. Similarly, by using the foregoing method, the prediction box h1 may also be retained.

It is to be understood that, based on the intersection over union (IOU) and the tag feature similarity, the prediction box r1 in the sequence {prediction box r2, prediction box h2, prediction box h1, and prediction box r1} may be deleted, to obtain a deleted sequence {prediction box r2, prediction box h2, prediction box h1}. Further, a new sequence {prediction box h2, prediction box h1} may be formed according to second prediction boxes (that is, second prediction regions) except the target prediction box (that is, the first prediction region), and then the prediction box h2 in the new sequence {prediction box h2, prediction box h1} is used as a new target prediction box (that is, a new first prediction region), and the prediction box h1 is used as a new second prediction box. Similarly, in the foregoing same manner, it may be determined, based on the IOU and the tag feature similarity between the second prediction box h1 and the target prediction box h2, whether to retain the prediction box h1. For example, it may be determined that the IOU between prediction box h1 and prediction box h2 is 0.89, and the IOU is greater than the proportion threshold (e.g., 0.67); It may be obtained that a tag feature similarity between the prediction box h1 and the prediction box h2 is 0.98, and the tag feature similarity is greater than the similarity threshold (0.5). Because the IOU is greater than the proportion threshold and the tag feature similarity is also greater than the similarity threshold, the prediction box h1 may be deleted.

It is to be understood that, in the foregoing process of performing Tag NMS processing on {prediction box r2, prediction box h2, prediction box h1, prediction box r1}, prediction boxes finally retained are the prediction box r2 and the prediction box h2, where the prediction box r2 is a location of the object 20*c* in the image 200; and the prediction box h2 is a location of the object 20*d* in the image 200. Similarly, prediction boxes that belong to the same prediction object category in prediction boxes c1, c2, m1, and m2 may be classified into one category, and sorted according to category prediction probabilities, and then Tag NMS processing is performed on the sorted prediction boxes. As shown in FIG. 2, finally retained prediction boxes include the prediction box c2 and the prediction box m2, where the prediction box c2 is a location of the object 20*a* in the image 200, and the prediction box m2 is a location of the object 20*b* in the image 200.

Further, the service server may return an identification result obtained after the Tag NMS processing (a target prediction region of each object in the image 200) to the user terminal A, and the user a may view the identification result on a display interface of the user terminal A and perform subsequent processing.

It is to be understood that, when non-maximum suppression processing is performed on prediction boxes, if objects in the image are relatively close, and an overlapping area between prediction boxes of the objects is relatively large, an intersection over union is relatively large. In this case, if only the intersection over union is considered for non-maximum suppression processing, a prediction box that is not to be suppressed (for example, deleted) is deleted, which causes a problem of error suppression. For example, as shown in FIG. 2, the object 20*c* and the object 20*d* are used as an example. If the two objects are located close to each other in the image 200, in the prediction box r1, the prediction box r2, the prediction box h1, and the prediction box h2, an overlapping part between any two prediction boxes is relatively large, and an overlapping area between any two prediction boxes is relatively large. In this case, a sequence {prediction box r2, prediction box h2, prediction box h1, prediction box r1} is obtained by sorting according to category prediction probabilities, and when non-maximum suppression processing is performed, if only the intersection over union is considered, because the overlapping area between each of the prediction box h1 and the prediction box h2 and the prediction box r2 is relatively large, the intersection over union therebetween is also greater than the proportion threshold. Both the prediction box h1 and the prediction box h2 are suppressed (for example, deleted). It can be seen that, because the prediction box h1 and the prediction box h2 are the locations of the object 20d in the image 200, the prediction box h1 and the prediction box h2 are not to be deleted. That is, when non-maximum suppression processing is performed, in a manner of only considering the intersection over union, the prediction box h1 and the prediction box h2 are mistakenly deleted, resulting in that the object 20d does not have a prediction box, and a location of the object 20d in the image 200 is not identified in a final identification result.

However, in this embodiment of this disclosure, when non-maximum suppression processing is performed on the prediction box, in addition to considering the intersection over union between prediction boxes, a tag feature similarity of object tag features between the prediction boxes is further considered. Only when the intersection over union is greater than the proportion threshold and the tag feature similarity is also greater than the similarity threshold, the prediction boxes are suppressed. As shown in FIG. 2, in an example in which the prediction box h2 and the prediction box r2 are used, if the two objects 20c and 20d are located very close to each other in the image 200, an overlapping part between the prediction box h2 and the prediction box r2 is relatively large, and an overlapping area is relatively large. However, because an object corresponding to the prediction box h2 is different from an object corresponding to the prediction box r2, the object 20d in the prediction box h2 and the object 20c in the prediction box r2 have different object tag features (for example, the object 20c is long red hair and red clothing; but the object 20d is black short hair and white clothing). In this case, the tag feature similarity between the prediction box h2 and the prediction box r2 is very low. In this case, even if the intersection over union between the prediction box h2 and the prediction box r2 is greater than the proportion threshold, when the tag feature similarity is lower than the similarity threshold, when the prediction box r2 is used as the target prediction box, the prediction box h2 is not deleted, but the prediction box h2 is temporarily retained. It may be learned that, in this application, when non-maximum suppression processing is performed on the prediction box, accuracy of the image identification result can be improved at multiple angles based on the intersection over union and the tag feature similarity.

Further, FIG. 4 is a method flowchart of a data identification method according to an embodiment of this disclosure. The method may be performed by a user terminal (for example, any user terminal in the user terminal cluster shown in FIG. 1, such as the user terminal 100b), may be performed by a service server (for example, the service server 1000 shown in FIG. 1), or may be performed jointly by a user terminal and a service server. For ease of understanding, this embodiment is described by using an example in which the foregoing service server performs the method. The method may include at least the following step S101 to step S106:

In some embodiments, it is preferred that a first prediction region in a target image may be acquired according to the following step S101 to step S103: acquire a first prediction region in a target image, the first prediction region being a prediction region corresponding to a maximum prediction category probability in N prediction regions in the target image, the prediction category probability being a probability corresponding to a prediction object category of an object included in a corresponding prediction region, and prediction object categories of objects included in the N prediction regions being the same; N being a positive integer greater than 1.

Step S101: Acquire a target image, and identify N prediction regions of a target object in the target image; N being a positive integer.

In this embodiment of this disclosure, the target image may be an image normalized by means of data enhancement and image normalization. It may be understood that, after one original image is obtained, data enhancement and image normalization processing may be performed on the original image, and an original image obtained after data enhancement and image normalization processing may be referred to as the target image. The target image may include one or more objects (such as a vehicle, a person, a bird, an elephant, a monkey, a building, a watermark, and a beverage), and any of the one or more objects may be referred to as a target object.

Based on the foregoing description, prediction object categories of objects included in the N prediction regions are the same. Therefore, the N prediction regions of the target object in the target image are prediction regions of target objects whose prediction object categories are the same in the target image.

It may be understood that the location of the target object in the target image may be referred to as a region in which the target object is located. In this embodiment of this disclosure, the target image may be inputted to an image identification model, and the N prediction regions of the target object in the target image may be identified by using the image identification model. A specific method may be as follows: The target image may be inputted into an image identification model, and a candidate prediction region corresponding to the target image, an object existence probability corresponding to the candidate prediction region, and an initial prediction probability corresponding to the candidate prediction region may be outputted by using the image identification model; the object existence probability being a probability that an object exists in the candidate prediction region; and the N prediction regions of the target object in the target image may be acquired from multiple candidate prediction regions based on the object existence probability and the initial category prediction probability corresponding to the candidate prediction region.

The initial prediction probability corresponding to the candidate prediction region is a probability that an object in a corresponding candidate prediction region belongs to multiple categories.

For the object existence probability and the initial prediction probability corresponding to the candidate prediction region, a specific method for acquiring the N prediction regions of the target object in the target image from multiple candidate prediction regions may be as follows: A candidate prediction region whose object existence probability is greater than a probability threshold may be determined as an intermediate prediction region; a maximum initial prediction probability may be acquired from the initial prediction probability corresponding to the intermediate prediction region, and an object category corresponding to the maximum initial prediction probability may be determined as a prediction object category of an object included in the intermediate prediction region; region classification may be performed on multiple intermediate prediction regions based on prediction object categories of objects included in the intermediate prediction regions, to obtain M region sets; prediction object categories of objects included in intermediate prediction regions included in the same region set belonging to the same object category, and M being a positive integer; and then, a target region set may be acquired from the M region sets, an object included in an intermediate prediction region included in the target region set may be determined as the target object, and intermediate prediction regions included in the target region set may be determined as the N prediction regions of the target object in the target image.

The target region set may be any region set whose quantity of intermediate prediction regions is greater than 1. Certainly, the target region set may also be determined from the M region sets according to another screening condition.

In addition, after the candidate prediction region is outputted, the image identification model in this application may further output a prediction object tag feature corresponding to each candidate prediction region. The prediction object tag feature may refer to an object feature of an object included in each candidate prediction region. The object feature may include a feature of an object presented in the target image (for example, a hair color feature, a hair length feature, features of the five sense organs (for example, an eye size feature, a pupil color feature, a mouth thickness feature, a mouth size feature, a nose height feature), a clothing feature, and a clothing length feature). A specific method for outputting the prediction object tag feature corresponding to the candidate prediction region by the image identification model may be as follows: A region feature of the candidate prediction region may be extracted by using the image identification model; and then, feature extraction may be performed on the region feature to obtain a prediction object tag feature corresponding to the candidate prediction region; prediction object tag features corresponding to candidate prediction regions including prediction object tag features respectively corresponding to the N prediction regions.

That is, the region feature of the candidate prediction region is extracted by using the image identification model, and feature extraction is performed on the region feature, so as to obtain the prediction object tag feature corresponding to the candidate prediction region. In other words, the image identification model may output a prediction object tag feature respectively corresponding to each candidate prediction region.

The prediction object tag feature corresponding to each candidate prediction region may be outputted by using the image identification model, and the multiple candidate prediction regions include N prediction regions. Therefore, each prediction region in the N prediction regions also corresponds to a prediction object tag feature, so that the prediction object tag feature corresponding to each prediction region can be obtained.

In this embodiment of this disclosure, the prediction object tag feature corresponding to each prediction region may be obtained in another manner. For example, the image identification model further outputs a region feature of each candidate prediction region in the multiple candidate prediction regions. In this way, the service server may perform feature extraction on the region feature of each prediction region in the N prediction regions to obtain prediction object tag features respectively corresponding to the N prediction regions. For another example, after the image identification model outputs the N prediction regions, the service server may extract a region feature of each prediction region from the target image, and further perform feature extraction on the region feature of each prediction region to obtain the prediction object tag feature corresponding to each prediction region.

The region feature may include not only an object feature, but also a non-object feature. Therefore, by performing feature extraction on the region feature, the non-object feature can be rule out removed, so as to obtain the object feature.

To facilitate understanding of a specific process of identifying the N prediction regions of the target object in the target image, the following is described with reference to the foregoing embodiment corresponding to FIG. 2. As shown in FIG. 2, the image 200 may be used as the target image. After the service server inputs the image 200 to the image identification model, the image identification model may output a prediction box c1, a prediction box c2, a prediction box r1, a prediction box r2, a prediction box h1, a prediction box h2, a prediction box m1, and a prediction box m2, the prediction box c1, the prediction box c2, the prediction box r1, the prediction box r2, the prediction box h1, the prediction box h2, the prediction box m1, and the prediction box m2 may all be referred to as candidate prediction regions. In addition, the image identification model may further output an object existence probability, an initial prediction probability, and an object tag feature that are corresponding to each prediction box. A prediction box with an object existence probability greater than a probability threshold may be referred to as an intermediate prediction region. For example, if the prediction box c1, the prediction box c2, the prediction box r1, the prediction box r1, the prediction box h1, the prediction box h2, the prediction box m1, and the prediction box m2 each have an object existence probability greater than the probability threshold, these prediction boxes may be referred to as to intermediate prediction regions, and a prediction object category corresponding to each of the intermediate prediction regions may be further determined according to an initial prediction probability corresponding to the intermediate prediction region. Further, prediction boxes that belong to the same prediction object category may be classified into one category in the intermediate prediction region, so that multiple region sets can be obtained. For example, the prediction box c1 and the prediction box c2 that belong to the object category "vehicle" may be used as one region set, the prediction box m1 and the prediction box m2 that belong to the object category "animal" may be used as one region set, and the prediction box r1, the prediction box r2, the prediction box h1, and the prediction box h2 that belong to the object category "person" may be used as one region set. It is to be understood that an object included in any region set may be determined as a target object, and this region set may be referred to as N prediction regions of the target object. For example, the object 20c and the object 20d included in the region set including the prediction box r1, the prediction box r2, the prediction box h1, the prediction box h2, and the prediction box h2 may be all determined as target objects. In this case, the prediction box r1, the prediction box r2, the prediction box h1, and the prediction box h2 may be determined as N prediction regions of the target objects (including the object 20c and the object 20d).

After the initial prediction probability corresponding to each prediction region is obtained, region division is performed according to the initial prediction probability to obtain different region sets. For example, initial prediction probabilities of the prediction box m1 shown in FIG. 2 are (0.65, 0.35), where an object category corresponding to the initial prediction probability 0.65 is "animal", and an object category corresponding to the initial prediction probability 0.35 is "person". When region division is performed, prediction boxes whose object categories belong to "person" include the prediction box r1, the prediction box r2, the prediction box h1, the prediction box h2, the prediction box m1, and the prediction box m2. That is, the prediction box r1, the prediction box r2, the prediction box h1, the prediction box h2, the prediction box m1, and the prediction box m2 may form a region set {prediction box r1, prediction box r2, prediction box h1, prediction box h2, prediction box m1, and prediction box m2}. Category prediction probabilities of the prediction boxes in the region set for the object category "person" are different from each other. When region division is performed according to the category prediction probability of the object category "animal", a region set may also be obtained as follows: {prediction box r1, prediction box r2, prediction box h1, prediction box h2, prediction box m1, prediction box m2}. Category prediction probabilities of the prediction boxes in the region set for the object category "animal" are different from each other.

Step S102: Acquire a prediction object category and a prediction object tag feature that are corresponding to a target object in each prediction region.

In this embodiment of this disclosure, the prediction object category and the prediction object tag feature that are respectively corresponding to each candidate prediction region may be outputted by using the image identification model. Because the candidate prediction region includes N prediction regions, each prediction region in the N regions also corresponds to a prediction object category and a prediction object tag feature, and a prediction object category and a prediction object tag feature that are respectively corresponding to each prediction region may be obtained.

Step S103: Acquire a maximum category prediction probability from category prediction probabilities respectively corresponding to the N prediction object categories, and determine a prediction region corresponding to a prediction object category that has the maximum category prediction probability as a first prediction region.

In this embodiment of this disclosure, because the prediction object category of the target object included in each prediction region is determined based on the initial prediction probability outputted by the image identification model, a specific method is as follows: In the initial prediction probabilities outputted by the image identification model, the object category corresponding to the maximum initial prediction probability is determined as the prediction object category corresponding to the prediction region, and the category prediction probability corresponding to the prediction object category may be understood as the maximum initial prediction probability. For example, initial prediction probabilities corresponding to the prediction box u1 are (0.9, 0.1), an object category corresponding to the initial prediction probability 0.9 is "flower", and an object category corresponding to the initial prediction probability 0.1 is "tree". Because the initial prediction probability 0.9 is greater than the initial prediction probability 0.1, it may be determined that a prediction object category corresponding to the prediction box u1 is "flower", and the maximum initial prediction probability 0.9 may be used as a category prediction probability of the prediction object category "flower".

It is to be understood that, in this embodiment of this disclosure, a category prediction probability corresponding to a prediction object category of each of the N prediction regions may be obtained, the N prediction regions may be sorted according to a sequence of the category prediction probabilities, a prediction region corresponding to a maximum category prediction probability may be obtained after sorting, and the prediction region corresponding to the maximum category prediction probability may be referred to as a first prediction region. For example, the N prediction regions may be sorted in descending order of the category prediction probabilities. In a sequence obtained by sorting, a prediction region at the first sequence location is the prediction region corresponding to the maximum category prediction probability, and the prediction region at the first sequence location may be referred to as the first prediction region.

Step S104: Determine a coverage region jointly covered by a second prediction region and the first prediction region; the second prediction region being a prediction region other than the first prediction region in the N prediction regions.

In this embodiment of this disclosure, a coverage region jointly covered by each second prediction region and the first prediction region may be determined.

In some embodiments, after the coverage region is determined by using the foregoing steps, the similarity corresponding to each second prediction region may be further determined according to the following step S105, and the target prediction region is determined in the N prediction regions based on the area of the coverage region and the similarity corresponding to each second prediction region according to the following step S106, the similarity being used for indicating a similarity between an object in a corresponding second prediction region and an object in the first prediction region, and the target prediction region being a region in which one object of the target image is located.

Step S105: Determine a tag feature similarity between a prediction object tag feature corresponding to the second prediction region and a prediction object tag feature corresponding to the first prediction region.

In this embodiment of this disclosure, the prediction object tag feature corresponding to each second prediction region and the prediction object tag of the first prediction region may be obtained, so as to determine the tag feature similarity between each second prediction region and the first prediction region. In an example in which the second prediction region includes a second prediction region sa (a is a positive integer), a specific method for determining the tag feature similarity may be as follows: A prediction object tag feature (which may be referred to as a first prediction object tag feature) corresponding to the second prediction region sa may be acquired, and a prediction object tag feature (which may be referred to as a second prediction object tag feature) corresponding to the first prediction region may be acquired. Further, a first feature vector corresponding to the first prediction object tag feature may be acquired, and a second feature vector corresponding to the second prediction object tag feature may be acquired. A vector angle value between the first feature vector and the second feature vector may be determined, a cosine similarity corresponding to the vector angle value may be determined, and the cosine similarity may be determined as a tag feature similarity between the first feature vector and the second feature vector.

To facilitate understanding of a specific method for calculating a cosine similarity between two prediction object tag features, refer to the following formula (1). Calculating a cosine similarity between two prediction object tag features may be shown in formula (1):

$$\cos_{similarity(A,B)} = \frac{A \cdot B}{\|A\|\|B\|} = \frac{\sum_{i}^{n} A_i \times B_i}{\sqrt{\sum_{i}^{n} (A_i)^2} \times \sqrt{\sum_{i}^{n} (B_i)^2}} \quad \text{Formula (1)}$$

A and B shown in formula (1) may be two different prediction object tag features, and $A_i$ may be understood as an ith prediction object tag sub-feature included in A. $B_i$ may be understood as an ith prediction object tag feature sub-feature included in B. For example, an object included in the prediction box u1 is an object 1, a prediction object tag feature thereof includes {long red hair and blue coat}, an object included in the prediction box u2 is an object 2, and a prediction object tag feature thereof includes {short black hair and red coat}. Both "red long hair" and "blue coat" may be referred to as prediction object tag sub-features (corresponding to $A_i$ in formula (1)), and the prediction object tag sub-features "red long hair" and "blue coat" jointly compose a prediction object tag feature corresponding to the prediction box u1 {red long hair, blue coat}. Similarly, both "black short hair" and "red coat" may be referred to as prediction object tag sub-features (corresponding to $B_i$ in formula (2)), and the prediction object tag sub-features "black short hair" and "red coat" jointly compose a prediction object tag feature corresponding to the prediction box u2 {red long hair, blue coat}.

A specific method for determining the tag feature similarity may further be as follows: A prediction object tag feature (which may be referred to as a first prediction object tag feature) corresponding to the second prediction region sa may be acquired, and a prediction object tag feature (which may be referred to as a second prediction object tag feature) corresponding to the first prediction region may be acquired. Further, a first feature vector corresponding to the first prediction object tag feature may be acquired, and a second feature vector corresponding to the second prediction object tag feature may be acquired. A vector distance (for example, a Euclidean distance) between the first feature vector and the second feature vector may be determined, and the vector distance may be determined as a tag feature similarity between the first feature vector and the second feature vector.

Step S106: Determine a target prediction region of the target object in the target image from the N prediction regions according to the coverage region and the tag feature similarity.

In this embodiment of this disclosure, a specific method for determining the target prediction region from the N prediction regions according to the coverage region and the tag feature similarity may be as follows: determining an intersection over union corresponding to the second prediction region based on the area of the coverage region, the intersection over union being a ratio between the area of the coverage region and an area of a non-coverage region, and the non-coverage region being a region other than the coverage region in the first prediction region and the second prediction region; and determining the target prediction region from the N prediction regions based on an intersection over union corresponding to each second prediction region and the similarity corresponding to each second prediction region.

An implementation process of determining an intersection over union between the second prediction region and the first prediction region includes: using a region not covered by the second prediction region and in the first prediction region as a first operation region; using a region not covered by the first prediction region and in the second prediction region as a second operation region; then performing addition processing on a region area corresponding to the first operation region and a region area corresponding to the second operation region to obtain a first region area; and acquiring a second region area corresponding to the coverage region, determining an area ratio between the second region area and the first region area, and determining the area ratio as the intersection over union between the second prediction region and the first prediction region.

A specific method for determining the target prediction region of the target object in the target image from the N prediction regions according to the area ratio and the tag feature similarity may be as follows: When the area ratio is greater than or equal to the proportion threshold and the tag feature similarity is greater than or equal to the similarity threshold, the first prediction region in the N prediction regions may be determined as the target prediction region of the target object in the target image. When the area ratio is less than the proportion threshold or the tag feature similarity is less than the similarity threshold, both the second prediction region and the first prediction region in the N prediction regions may be determined as the target prediction regions of the target object in the target image.

That is, the first prediction region is determined as the target prediction region when the intersection over union corresponding to each second prediction region is greater than or equal to a proportion threshold, and the similarity corresponding to each second prediction region is greater than or equal to a similarity threshold. For any second prediction region, both the second prediction region and the first prediction region are determined as the target prediction regions when the intersection over union corresponding to the second prediction region is less than the proportion threshold, or the similarity corresponding to the second prediction region is less than the similarity threshold.

It is to be understood that the foregoing area ratio may be understood as the intersection over union. After the first prediction region is determined, whether to delete the second prediction region may be jointly determined according to the intersection over union and the tag feature similarity between the second prediction region and the first prediction region. The corresponding second prediction region is deleted only when the area ratio is greater than or equal to the proportion threshold and the tag feature similarity is greater than or equal to the similarity threshold. Otherwise, the corresponding second prediction region is retained.

It is to be understood that a specific process of performing non-maximum suppression processing on the prediction region according to the intersection over union and the tag feature similarity between the prediction regions to obtain the target prediction region may be divided into the following step 1 to step 3:

Step 1: Sort the N prediction regions according to a sequence of the category prediction probabilities corresponding to the prediction object categories, and select a prediction region corresponding to a maximum category prediction probability in the sequence as the first prediction region.

Step 2: Traverse second prediction regions in the sequence except the first prediction region, and if an intersection over union between a second prediction region and the current first prediction region is greater than or equal to a specific threshold (the proportion threshold) and a tag feature similarity is also greater than or equal to another threshold (for example, the similarity threshold), delete the second prediction region.

A reason for deleting the second prediction region is as follows: When the intersection over union exceeds the threshold and the tag feature similarity also exceeds the threshold, it may be considered that the objects included in the two prediction regions belong to the same object category and belong to the same object, and only a region (that is, the first prediction region) whose category prediction probability is higher in the two prediction regions needs to be retained.

Step 3: After one traversal is completed, in at least two retained second prediction regions, continue to select a prediction region corresponding to a maximum category prediction probability as a new first prediction region. Repeat steps 2 and 3 until all prediction regions are processed.

Figure 5:
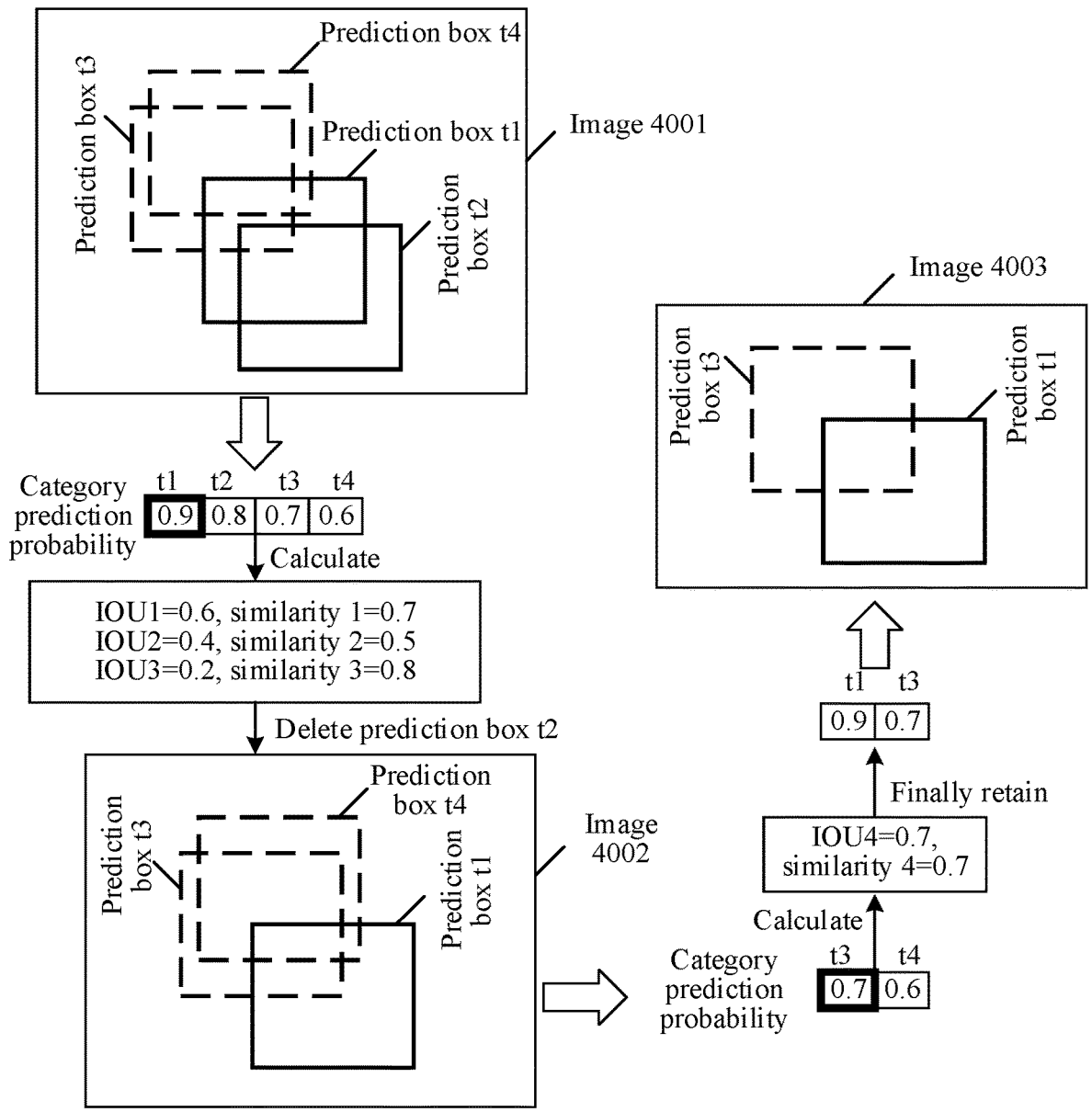
FIG. 5 is a schematic diagram of determining a target prediction region according to an embodiment of this disclosure.

It is to be understood that the foregoing prediction region may be understood as a prediction box. To facilitate understanding of non-maximum suppression processing performed on prediction boxes (prediction regions) according to an intersection over union (IOU) and a tag feature similarity between the prediction regions, a specific process of the target prediction region may be obtained. FIG. 5 is a schematic diagram of determining a target prediction region according to an embodiment of this disclosure.

As shown in FIG. 5, an image 4001 may include a prediction box t1, a prediction box t2, a prediction box t3, and a prediction box t4. Prediction object categories of the prediction box t1, the prediction box t2, the prediction box t3, and the prediction box t4 in the image 4001 may be all "puppy", and a category prediction probability of the prediction box t1 for the prediction object category puppy is 0.9, a category prediction probability of the prediction box t2 for the prediction object category puppy is 0.8, a category prediction probability of the prediction box t3 for the prediction object category puppy is 0.7, and a category prediction probability of the prediction box t4 for the prediction object category puppy is 0.6. Further, it is to be understood that, the prediction box t1, the prediction box t2, the prediction box t3, and the prediction box t4 may be sorted according to a sequence of the category prediction probabilities of the prediction object category puppy, to obtain a sorted sequence that may be {prediction box t1, prediction box t2, prediction box t3, prediction box t4}. It is to be understood that because the category prediction probability of the prediction box t1 is the maximum category prediction probability, the prediction box t1 may be used as a first prediction box (first prediction region), and the prediction box t2, the prediction box t3, and the prediction box t4 may be referred to as second prediction boxes (second prediction regions).

Further, as shown in FIG. 5, the second prediction boxes (including the prediction box t2, the prediction box t3, and the prediction box t4) may be traversed, and an intersection over union (IOU1) between the prediction box t2 and the prediction box t1 is calculated as 0.6 and a tag feature similarity (similarity 1) is calculated as 0.7. An intersection over union (IOU2) between the prediction box t3 and the prediction box t1 is determined as 0.4 and a tag feature similarity (similarity 2) is determined as 0.5. An intersection over union (IOU3) between the prediction box t4 and the prediction box t1 is determined as 0.2, and a tag feature similarity (similarity 3) is determined as 0.8. That the proportion threshold is 0.5 and the similarity threshold is 0.5 is used as an example. Because in these IOUs and the tag feature similarities, when only IOU1 is greater than the proportion threshold, the similarity 1 is also greater than the similarity threshold, and the rest do not meet the condition, the prediction box t2 may be deleted, and the prediction box t3 and the prediction box t4 are temporarily retained. Therefore, the image 4002 may be obtained. In the image 4002, the prediction box t2 is deleted.

Further, as shown in FIG. 5, the prediction box corresponding to the maximum category prediction probability may be further selected from the prediction box t3 and the prediction box t4. If the prediction box is the prediction box t3, the prediction box t3 may be used as a new first prediction box. An intersection over union (IOU4) between the prediction box t3 and the prediction box t4 is 0.7, and a tag feature similarity (similarity 4) is 0.7. Because IOU4 is greater than the proportion threshold 0.5 and the tag feature similarity is also greater than the similarity threshold 0.7, the prediction box t4 may be deleted. In this case, all prediction boxes are processed, so that retained prediction boxes can be finally obtained, including the prediction box t1 and the prediction box t3. Therefore, an image 4003 may be obtained. In the image 4003, after non-maximum suppression processing is performed on the prediction boxes, to obtain a prediction object category whose prediction object is "puppy", and corresponding target prediction boxes include the prediction box t1 and the prediction box t3.

In this embodiment of this disclosure, after the N prediction regions of the target object in the target image are identified, the prediction object category and the prediction object tag feature corresponding to the target object in each prediction region may be acquired. The first prediction region may be acquired from the N prediction regions based on the category prediction probability corresponding to the prediction object category; and when the target prediction region of the target object is selected from the N prediction regions, the target prediction region of the target object in the target image may be jointly determined based on the overlapping region (a coverage region jointly covered) between the second prediction region and the first prediction region and the prediction object tag feature similarity. It is to be understood that the target object may be understood as an object in the target image, and the prediction region may be understood as a detection box of the object. In this embodiment of this disclosure, when determining the final detection box of the target object, in addition to considering the overlapping region between the detection boxes, the prediction object tag feature similarity between the detection boxes is further considered, and the target detection box jointly determined by the two is more accurate. In conclusion, in the embodiments of this disclosure, accuracy of object identification in an image can be improved.

It is to be understood that, N prediction regions of the target object in the target image, a prediction object category (the image identification model may output an object existence probability respectively corresponding to each prediction region and an initial prediction probability respectively corresponding to each prediction region; based on the object existence probability respectively corresponding to each prediction region and the initial prediction probability respectively corresponding to each prediction region, a prediction object category corresponding to each prediction region may be determined), and a prediction object tag feature respectively corresponding to each prediction region may be determined by using the image identification model. In this embodiment of this disclosure, to improve identification accuracy of the image identification model, the N prediction regions, the prediction object category, and the prediction object tag feature that are determined by using the image identification model are more accurate, and the image identification model may be trained. For a specific process of model training, references may be made to description in the subsequent embodiment corresponding to FIG. 6.

Figure 6:
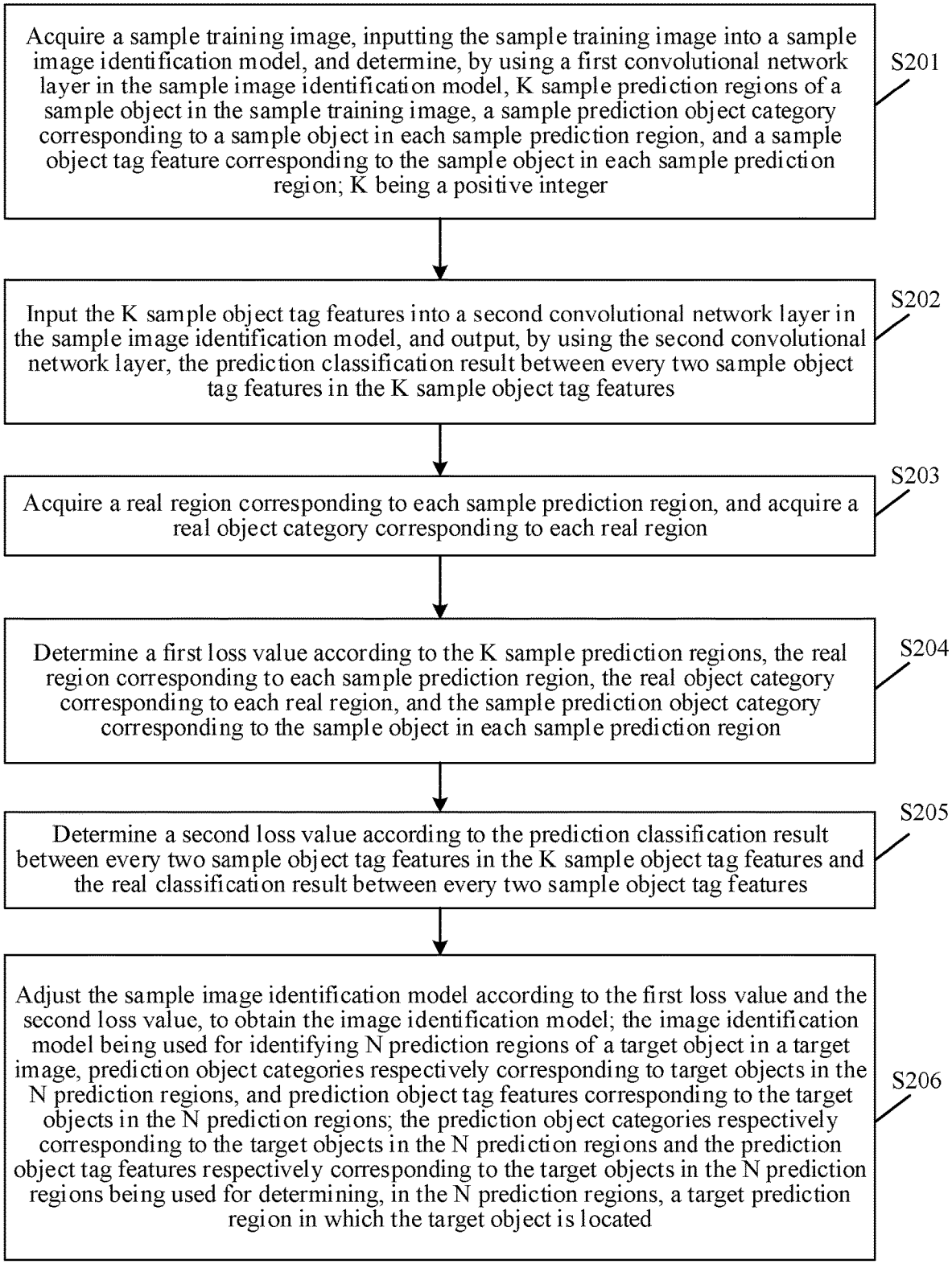
FIG. 6 is a schematic flowchart of another data identification method according to an embodiment of this disclosure.

FIG. 6 is a schematic flowchart of another data identification method according to an embodiment of this disclosure. The data identification method may be a model training method. The method may be performed by a user terminal (for example, any user terminal in the user terminal cluster shown in FIG. 1, such as the user terminal 100b), may be performed by a service server (for example, the service server 1000 shown in FIG. 1), or may be performed jointly by a user terminal and a service server. For ease of understanding, this embodiment of this disclosure is described by using an example in which the foregoing service server performs the method. The method may include at least the following step S201 to step S203:

In some embodiments, first, according to the following step S201 and step S202: determine, based on a sample training image and by using a sample image identification model, K sample prediction regions in the sample training image, a sample prediction object category corresponding to a sample object included in the sample prediction region, and a prediction classification result between every two sample object tag features in K sample object tag features, the K sample object tag features being sample object tag features corresponding to sample objects included in the K sample prediction regions, and K being a positive integer.

Step S201: Acquire a sample training image, inputting the sample training image into a sample image identification model, and determine, by using a first convolutional network layer in the sample image identification model, K sample prediction regions of a sample object in the sample training image, a sample prediction object category corresponding to a sample object in each sample prediction region, and a sample object tag feature corresponding to the sample object in each sample prediction region; K being a positive integer.

In this embodiment of this disclosure, the sample image identification model may be an untrained image identification model with an initialized parameter, and the sample image identification model may be a convolutional neural network (CNN) model, or may be a You Only Look Once (YOLO) model, or may be another model in which image identification may be performed. It may be understood that the sample training image is inputted to the sample image identification model, and a sample prediction region of a sample object in the sample training image, a sample object existence probability (which refers to a probability that the sample object exists in the sample prediction region), a sample category prediction probability, and a sample object tag feature that are corresponding to the sample prediction region may be outputted by using a first convolutional network layer in the sample image identification model. The sample prediction object category of the sample prediction region may be jointly determined by using the sample object existence probability and the sample category prediction probability of the sample prediction region.

For an implementation process of jointly determining, by using the sample object existence probability corresponding to the sample prediction region and the initial sample prediction probability, the sample prediction object category corresponding to the sample prediction region, references may be made to an implementation of determining the prediction object category corresponding to each prediction region in the N prediction regions in the target image in the foregoing embodiments.

Training the sample image identification model means training the first convolutional network layer. In the foregoing embodiment corresponding to FIG. 4, for a process of outputting the prediction object tag feature corresponding to each candidate prediction region, the feature may be outputted by the trained first convolutional network layer.

Certainly, the sample object tag feature corresponding to each sample prediction region may be further determined in another manner. For example, references may be made to the foregoing manner of determining the prediction object tag feature corresponding to each prediction region in the N prediction regions.

Step S202: Input the K sample object tag features into a second convolutional network layer in the sample image identification model, and output, by using the second convolutional network layer, the prediction classification result between every two sample object tag features in the K sample object tag features.

In this embodiment of this disclosure, the sample image identification model further includes a second convolutional network layer. The second convolutional network layer may classify any two sample object tag features, that is, determine whether the two sample object tag features belong to the same object.

Step S203: Acquire a real region corresponding to each sample prediction region, and acquire a real object category corresponding to each real region.

In this embodiment of this disclosure, each sample training image corresponds to one or more different candidate configuration real regions (a real region of each object in each sample training image may be manually labeled, and each sample training image may include one or more labeled real regions), and a real region corresponding to each sample prediction region may be acquired from the at least one candidate configuration real region. The object category corresponding to the real region may be used as the real object category corresponding to the sample prediction region. The following describes a specific method for acquiring the real region corresponding to each sample prediction region by using an example in which the K sample prediction regions include a sample prediction region $k_i$ (i may be a positive integer). A specific method may be as follows: A candidate configuration real region corresponding to the sample training image may be acquired; then, a sample coverage region covered by the sample prediction region $k_i$ and the candidate configuration real region may be determined; and a real region corresponding to the sample prediction region $k_i$ may be acquired from at least one candidate configuration real region based on an area of the sample coverage region.

A specific method for acquiring a real region corresponding to the sample prediction region $k_i$ from the candidate configuration real region based on an area of the sample coverage region may be: determining a sample intersection over union corresponding to the candidate configuration real region based on the area of the sample coverage region, the sample intersection over union being a ratio of the area of the sample coverage region to an area of a non-sample coverage region, and the non-sample coverage region being a region other than the sample coverage region in the candidate configuration real region and the sample prediction region $k_i$; and determining the candidate configuration real region as the real region corresponding to the sample prediction region $k_i$ when the sample intersection over union corresponding to the candidate configuration real region is greater than an area ratio threshold.

In an example, a region not covered by the sample prediction region $k_i$ and in the candidate configuration real region may be used as a first sample region, and a region not covered by the candidate configuration real region and in the sample prediction region $k_i$ may be used as a second sample region; and a sample area ratio si between the candidate configuration real region and the sample prediction region $k_i$ may be determined based on the first sample region, the second sample region, and the sample coverage region; and if the sample area ratio si is greater than the area ratio threshold, the candidate configuration real region may be determined as the real region of the sample object in the sample training image.

In some embodiments, after the foregoing steps are performed, the following steps may further be used: adjust the sample image identification model to obtain an image identification model based on the K sample prediction regions, the real region corresponding to the sample prediction region, the real object category corresponding to the real region, the sample prediction object category corresponding to the sample object included in the sample prediction region, and the prediction classification result and a real classification result between every two sample object tag features in the K sample object tag features.

Step S204: Determine a first loss value according to the K sample prediction regions, the real region corresponding to each sample prediction region, the real object category corresponding to each real region, and the sample prediction object category corresponding to the sample object in each sample prediction region.

In this embodiment of this disclosure, the sample prediction region may be understood as a sample prediction box and a candidate configuration real region may be understood as a real box, and the sample training image is corresponding to one or more real boxes. After the sample image identification model outputs all sample prediction boxes of the sample training image (the sample prediction boxes of the K sample objects in the sample training image are included in all sample prediction boxes), an intersection over union (IOU) may be calculated between any sample prediction box in all the sample prediction boxes and all real boxes. If a real box whose IOU between the sample prediction box is greater than or equal to a specific threshold (for example, the area ratio threshold) exists in the all real boxes, the sample prediction box may be determined as a positive sample, and the real box whose IOU is greater than or equal to a specific threshold is determined as a real box (that is, a real region) corresponding to the sample prediction box.

It may be understood that if IOUs between two or more real boxes and the sample prediction box are greater than or equal to a threshold in all the real boxes, a real box with a largest IOU may be acquired from the two or more real boxes, and the real box with the largest IOU is determined as the real box corresponding to the sample prediction box, and the sample prediction box is determined as a positive sample. For example, all the real boxes include a real box 1, a real box 2, and a real box 3. Using any sample prediction region in all sample prediction regions as a sample prediction region (sample prediction box) of the sample object in the sample training image, it may be determined that an IOU between the sample prediction box and the real box 1 is 0.87, an IOU between the sample prediction box and the real box 2 is 0.88, and an IOU between the sample prediction box and the real box 3 is 0.2. If the area ratio threshold is 0.6, because 0.87 and 0.88 are both greater than the area ratio threshold 0.6, the sample prediction box may be determined as a positive sample. In addition, because 0.88 is greater than 0.87, the real box 2 may be determined as a real box (that is, a real region) corresponding to the sample prediction box.

Similarly, if IOUs between all the real boxes and a sample prediction box are less than the area ratio threshold, the sample prediction box may be determined as a negative sample, and a real box (that is, a real region) corresponding to the negative sample does not exist in all the real boxes.

It is to be understood that, it may be learned from the description of determining a real region corresponding to each sample prediction region in the at least one candidate configuration real region that all sample prediction regions outputted by the first convolutional network layer may be divided into a positive sample region and a negative sample region. The positive sample region may correspond to a real region, and the negative sample region represents a prediction error region outputted by the first convolutional network layer, and does not correspond to a real region. Because the sample prediction region of the sample object in the sample training image is included in all the sample prediction regions, the sample prediction region of the sample object in the sample training image is also divided into a positive sample region and a negative sample region.

The K sample prediction regions may be all the sample prediction regions, or may be some sample prediction regions in all the sample prediction regions.

In this embodiment of this disclosure, for a positive sample region, it is expected that the sample image identification model can predict a real region corresponding to the positive sample region. Therefore, a higher prediction confidence and a more accurate sample prediction region are expected, and a sample prediction object category corresponding to the sample prediction region is also expected to be consistent with a corresponding real object category. For a negative sample region, a prediction confidence as low as possible is expected, which is used for representing that the prediction result is not accurate. That is, a positive sample confidence loss value may be generated according to the positive sample region (higher prediction confidence is made available for the positive sample region by using the confidence loss value), a positive sample region loss value (more accurate sample prediction region can be made available for the positive sample region by using the region loss value), and a category loss value (more accurate prediction object category corresponding to the sample prediction region is made available by using the category loss value); The negative sample confidence loss value may be generated according to the negative sample region, and a first loss value is jointly generated according to the positive sample confidence loss value, the positive sample region loss value, the positive sample category loss value, and the negative sample confidence loss value.

For example, the K sample prediction regions further include a sample prediction region $k_j$ (that is, the K sample prediction regions include the foregoing sample prediction region $k_i$ and the sample prediction region $k_j$). A sample prediction object category corresponding to the sample object in the sample prediction region $k_i$ is determined based on a sample object existence probability and a sample category prediction probability that are of the sample object in the sample prediction region $k_i$ outputted by the first convolutional network layer. The sample object existence probability of the sample prediction region $k_i$ refers to a probability that a sample object exists in the sample prediction region $k_i$. The sample prediction object category corresponding to the sample object in the sample prediction region $k_j$ is determined based on a sample object existence probability and a sample category prediction probability that are of the sample object in the sample prediction region $k_j$ that are outputted by the first convolutional network layer; the sample object existence probability of the sample prediction region $k_j$ refers to a probability that a sample object exists in the sample prediction region $k_j$; and a specific method for generating the first loss value may be: acquiring a sample area ratio $s_j$ corresponding to the sample region prediction region $k_j$, determining a sample prediction region whose sample area ratio si and sample area ratio $s_j$ are greater than or equal to an area ratio threshold, as a positive sample region, and determining a sample prediction region whose sample area ratio is less than the area ratio threshold as a negative sample region; generating a positive sample initial loss value based on the positive sample region, a real region corresponding to the positive sample region, a real object category corresponding to the real region corresponding to the positive sample region, and a sample prediction object category corresponding to a sample object in the positive sample region; generating a positive sample confidence loss value according to a sample object existence probability corresponding to the positive sample region; generating a negative sample confidence loss value according to a sample object existence probability corresponding to the negative sample region; and performing addition processing on the positive sample initial loss value, the positive sample confidence loss value, and the negative sample confidence loss value to obtain the first loss value. That is, the first loss value is obtained by performing addition processing on a positive sample initial loss value and a positive sample confidence loss value that are corresponding to each positive sample region and a negative sample confidence loss value corresponding to each negative sample region.

A specific method for generating the positive sample initial loss value may be: determining a region loss value according to the real region corresponding to the positive sample region and the positive sample region; determining a category loss value according to the sample prediction object category of the sample object in the positive sample region and the real object category corresponding to the real region corresponding to the positive sample region; and performing addition processing on the region loss value and the category loss value to obtain the positive sample initial loss value.

A specific method for generating the first loss value may be shown in the following formula (2):

$$\text{loss}_{total} = \sum_{pos}(\text{loss}(x, y, w, h) + \text{loss}(cls) + \text{loss}(conf)) + \sum_{neg}\text{loss}(conf) \qquad \text{Formula (2)}$$

loss(x, y, w, h) may be used for representing a region loss value generated by a positive sample region and a corresponding real region, and x, y, w, and h may be used for representing coordinate location information of the positive sample region in a training sample image; loss(cls) may be used for representing a category loss value generated by a sample prediction object category of the positive sample region and its corresponding real object category; loss(conf) may be used for representing a confidence loss value corresponding to a positive sample region or a negative sample region; $\Sigma_{neg}\text{loss}(conf)$ may be used for representing a sum of confidence loss values corresponding to all negative sample regions; and $\Sigma_{pos}(\text{loss}(x, y, w, h)+\text{loss}(cls)+\text{loss}(conf))$ may be used for representing positive sample loss values corresponding to all positive sample regions (add and sum region loss values, category loss values, and confidence loss values of all positive sample regions to obtain a positive sample loss value).

When the foregoing loss(x, y, w, h) (that is, the region loss value corresponding to the positive sample region) is calculated, a loss value corresponding to coordinate location information x, a loss value corresponding to coordinate location information y, a loss value corresponding to coordinate location information w, and a loss value corresponding to coordinate location information h may be calculated, and then the loss value corresponding to the coordinate location information x, the loss value corresponding to the coordinate location information y, the loss value corresponding to the coordinate location information w, and the loss value corresponding to the coordinate location information h are fused (for example, added), to obtain loss(x, y, w, h) corresponding to each positive sample region. For ease of understanding, the following uses calculating the loss value corresponding to the coordinate location information x as an example to describe calculating the loss value corresponding to each coordinate location information. The calculating the loss value corresponding to coordinate location information x may be shown in the following formula (3):

$$L1 \; \text{loss}(x, x_{truth}) = |x - x_{truth}| \qquad \text{Formula (3)}$$

x may be used for representing the coordinate location information x in the positive sample region, $x_{truth}$ may be used for representing a real value corresponding to the coordinate location information x, and L1 loss(x, $x_{truth}$) may be used for representing the loss value corresponding to the coordinate location information x. It is to be understood that for the coordinate location information y, the coordinate location information w, and the coordinate location information h in the positive sample region, the loss value calculation manner shown in formula (3) may also be used for calculating the loss values respectively corresponding to the coordinate location information y, the coordinate location information w, and the coordinate location information h.

Step S205: Determine a second loss value according to the prediction classification result between every two sample object tag features in the K sample object tag features and the real classification result between every two sample object tag features.

It is to be understood that the first convolutional network layer in this embodiment of this disclosure may further output the sample object tag feature corresponding to each sample prediction region. The first convolutional network layer outputs multiple sample prediction regions of the same object (for example, the same sample object). In this embodiment of this disclosure, it is expected that sample object tag features corresponding to different sample prediction regions of the same object are more similar, and sample object tag features of different objects may be more different. In this embodiment of this disclosure, the tag feature loss value may be generated according to the sample object tag feature corresponding to the sample prediction region. Because the negative sample region is a prediction region with a prediction error, the negative sample region may not be considered when the tag feature loss value is generated. That is, in this embodiment of this disclosure, the tag feature loss value corresponding to the positive sample region may be generated based on the sample object tag feature corresponding to the positive sample region. The tag feature loss value may be referred to as a second loss value, and the second loss value may be used for training the sample image identification model (that is, the first convolutional network layer) together with the first loss value.

The K sample prediction regions include a first sample prediction region and a second sample prediction region; and the K sample object tag features include a first sample object tag feature corresponding to the first sample prediction region and a second sample object tag feature corresponding to the second sample prediction region. An example in which the first sample prediction region and the second sample prediction region belong to a positive sample region is used. A specific method for generating the second loss value may be: inputting the first sample object tag feature and the second sample object tag feature to a second convolutional network layer, and performing feature classification on the first sample object tag feature and the second sample object tag feature by using the second convolutional network layer, to obtain a prediction classification result between the first sample object tag feature and the second sample object tag feature; determining a real classification result between the first sample object tag feature and the second sample object tag feature according to a real object category corresponding to a real region corresponding to the first sample prediction region and a real object category corresponding to a real region corresponding to the second sample prediction region; and determining a second loss value according to the prediction classification result between the first sample object tag feature and the second sample object tag feature, and the real classification result between the first sample object tag feature and the second sample object tag feature.

The prediction classification result may include the same category or different categories, and the real classification result may also include the same category or different categories. For details, refer to the following description.

It is to be understood that a total loss value may be generated according to the first loss value and the second loss value, and the sample image identification model may be trained according to the total loss value. For ease of understanding a specific implementation of generating the total loss value in this embodiment of this disclosure, references may be made to the following formula (4). Formula (4) may be used for generating a representation of the total loss value in this embodiment of this disclosure.

$$\text{loss}_{total} = \sum_{pos}(\text{loss}(x, y, w, h) + \text{loss}(cls) + \text{loss}(conf)) + \sum_{random\ pos}\text{loss}(tag) + \sum_{neg}\text{loss}(conf) \quad \text{Formula (4)}$$

For example, in formula (4), $\Sigma_{pos}(\text{loss}(x, y, w, h)+\text{loss}(cls)+\text{loss}(conf))$ may be used for representing adding and summing region loss values, category loss values, and confidence loss values of all positive sample regions; loss(tag) may be used for representing a tag feature loss value (that is, a second loss value) between any two positive sample regions; and $\Sigma_{random\ pos}\text{loss}(tag)$ may be used for representing a loss value (that is, a tag feature loss value corresponding to all positive sample regions) obtained by summing tag feature loss values between every two positive sample regions after the tag feature loss values between every two positive sample regions in all positive sample regions are calculated.

It is to be understood that, as shown in formula (4), in this embodiment of this disclosure, when a loss value corresponding to a positive sample region is calculated, not only a region loss value, a category loss value, and a confidence loss value are calculated, but also a tag feature loss value corresponding to the positive sample region is calculated. A loss value corresponding to the positive sample region may be jointly generated according to the region loss value, the category loss value, the confidence loss value, and the tag feature loss value. For a specific implementation of determining $\Sigma_{pos}(\text{loss}(x, y, w, h)+\text{loss}(cls)+\text{loss}(conf))$, refer to the description in the foregoing formula (3). For a specific implementation of determining loss(tag), the following formula (5) may be used:

$$\text{BCE loss}(t, t_{truth}) = y \cdot \log(t) + (1 - t_{truth}) \cdot \log(1 - t) \quad \text{Formula (5)}$$

It is to be understood that, unlike the sample prediction region and the sample prediction object category, the sample object tag feature does not have a corresponding real value, and the sample object tag feature is actually a feature vector. In this embodiment of this disclosure, it is expected that sample object tag features corresponding to different sample prediction regions of the same object may be more similar. Sample object tag features corresponding to sample prediction regions of different objects may be more different. This embodiment of this disclosure may provide a convolutional neural network, and deploy the convolutional neural network in a sample image identification model (that is, the foregoing second convolutional network layer). Sample object tag features of different sample prediction regions may be extracted by using the first convolutional network layer, and any two sample object tag features may be classified by using the second convolutional network layer. For example, t in formula (5) may be used for representing that the second convolutional network layer classifies two sample object tag features corresponding to any two sample prediction regions to obtain a prediction classification result (for example, the prediction classification result may include the same category or different categories, t may be 1 in the case of the same category, and t may be 0 in the case of different categories). For example, $t_{truth}$ in formula (5) may be used for representing real classification results (for example, the real classification results are that categories are the same or categories are different) corresponding to two sample object tags corresponding to the two sample prediction regions.

It is to be understood that a positive sample loss value corresponding to a positive sample region and a negative sample loss value corresponding to a negative sample region (that is, a negative sample confidence loss value) may be determined by using formula (4), and a total loss value ($\text{loss}_{total}$) may be obtained by adding the positive sample loss value and the negative sample loss value.

Step S206: Adjust the sample image identification model according to the first loss value and the second loss value, to obtain the image identification model; the image identification model being used for identifying N prediction regions of a target object in a target image, prediction object categories respectively corresponding to target objects in the N prediction regions, and prediction object tag features corresponding to the target objects in the N prediction regions; the prediction object categories respectively corresponding to the target objects in the N prediction regions and the prediction object tag features respectively corresponding to the target objects in the N prediction regions being used for determining, in the N prediction regions, a target prediction region in which the target object is located; and N being a positive integer.

In this embodiment of this disclosure, the parameter of the sample image identification model may be adjusted according to the first loss value and the second loss value (that is, the total loss value), and when the sample image identification model meets a model convergence condition (for example, a quantity of training iterations is reached or the total loss value falls within an allowed error range), the sample image identification model that meets the model convergence condition is determined as the image identification model. The image identification model may be applied to subsequent image identification applications.

In this embodiment of this disclosure, a sample image identification model is trained by using a sample training image, so that the sample image identification model can accurately identify a prediction region of a target object in a target image, a prediction object category of the target object included in the prediction region, and a prediction object tag feature of the target object included in the prediction region. Further, an accurate target prediction region of the target object can be determined based on an accurate prediction region, prediction object category, and prediction object tag feature. Accuracy of object identification in an image can be improved.

Figure 7:
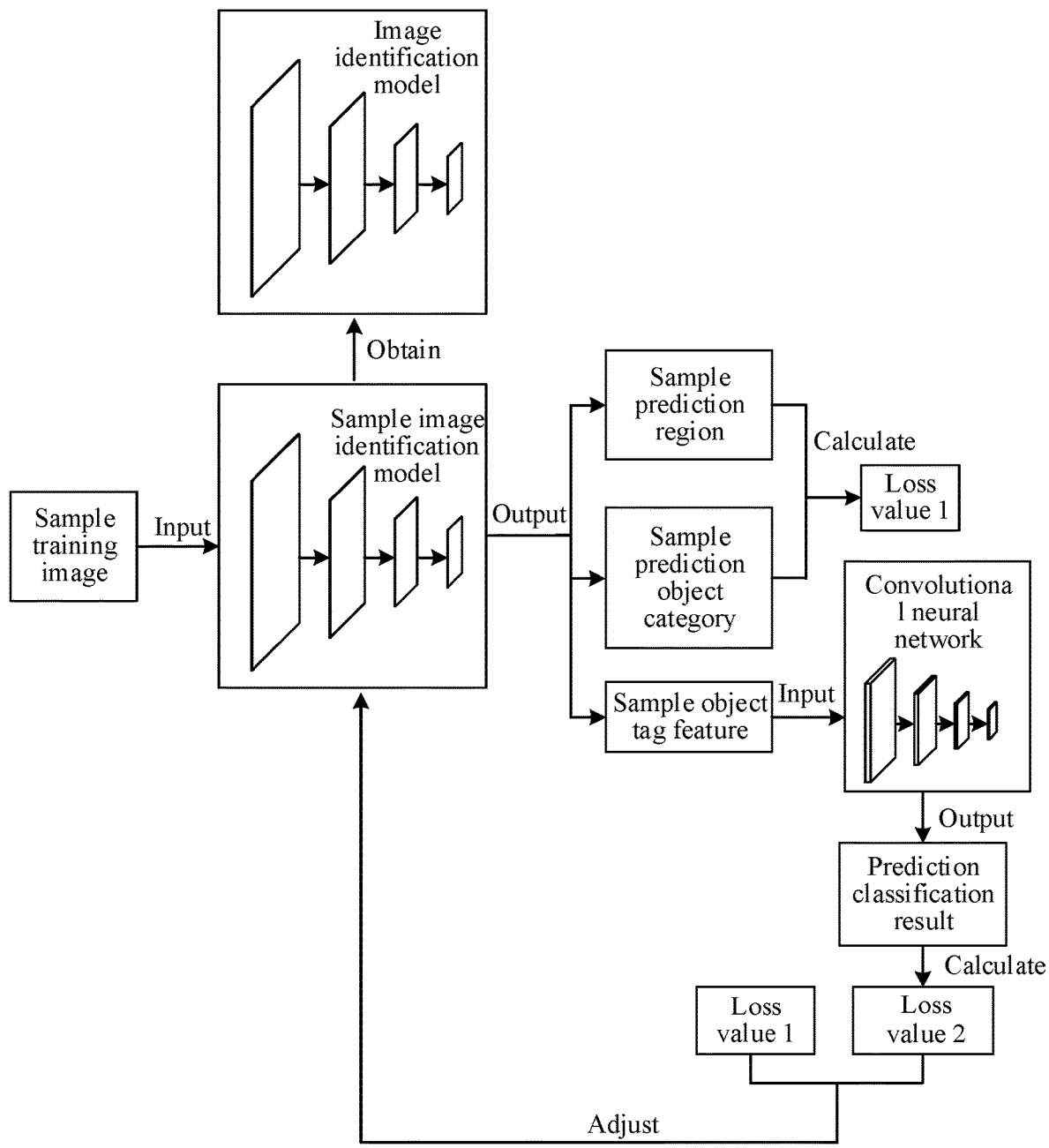
FIG. 7 is a schematic diagram of model training according to an embodiment of this disclosure.

For ease of understanding the model training process in this embodiment of this disclosure, references may be made to FIG. 7. FIG. 7 is a schematic diagram of model training according to an embodiment of this disclosure.

As shown in FIG. 7, a sample training image is inputted into a sample image identification model, and a sample prediction object category corresponding to a sample prediction region and a sample prediction region of the sample training image may be determined by using the sample image identification model (the sample image identification model may output a sample object existence probability and an initial sample prediction probability that are corresponding to the sample prediction region; and the sample object existence probability and the initial sample prediction probability that are corresponding to the sample prediction region may be used for determining a sample prediction object category corresponding to the sample prediction region) and a sample tag feature corresponding to the sample prediction region. It is to be understood that the sample prediction region may include a positive sample region and a negative sample region (for a specific implementation of determining the positive sample region and the negative sample region, refer to descriptions in the foregoing embodiment corresponding to FIG. 6), and a region loss value, a category loss value, and a confidence loss value that are corresponding to the positive sample region may be determined according to a sample prediction region and a sample prediction object category of the positive sample region (the confidence loss value may be determined based on an object existence probability of the positive sample region). A confidence loss value corresponding to the negative sample region may be determined according to an object existence probability of the negative sample region. The region loss value, the category loss value, the positive sample confidence loss value, and the negative sample confidence loss value corresponding to the negative sample region may be referred to as a loss value 1 (that is, the first loss value in the foregoing) shown in FIG. 7.

Further, as shown in FIG. 7, two of sample object tag features corresponding to the positive sample region may be combined in different manners as a group of feature groups. The feature group is inputted to the convolutional neural network shown in FIG. 7, and the convolutional neural network may classify the two sample object tag features to determine whether the two sample object tag features belong to the same category. It is to be understood that the convolutional neural network may be deployed in the sample image identification model as the foregoing second convolutional network layer. The sample object tag feature corresponding to the sample prediction region may be extracted by using the first convolutional network layer in the sample image identification model, and any two sample object tag features are inputted into the second convolutional network layer. The second convolutional network layer may classify the two sample object tag features. Further, based on a prediction classification result outputted by the convolutional neural network, the tag feature loss value corresponding to the positive sample region may be calculated, and the tag feature loss value may be referred to as a loss value 2 (that is, the foregoing second loss value) shown in FIG. 7. The sample image identification model may be jointly adjusted according to the loss value 1 and the loss value 2 to obtain a final image identification model. For a specific implementation of generating the loss value 1 and the loss value 2, references may be made to descriptions of the region loss value corresponding to the positive sample region, the category loss value, the positive sample confidence loss value, the negative sample confidence loss value corresponding to the negative sample region, and the tag feature loss value corresponding to the positive sample region that are generated in the foregoing embodiment corresponding to FIG. 6.

Figure 8:
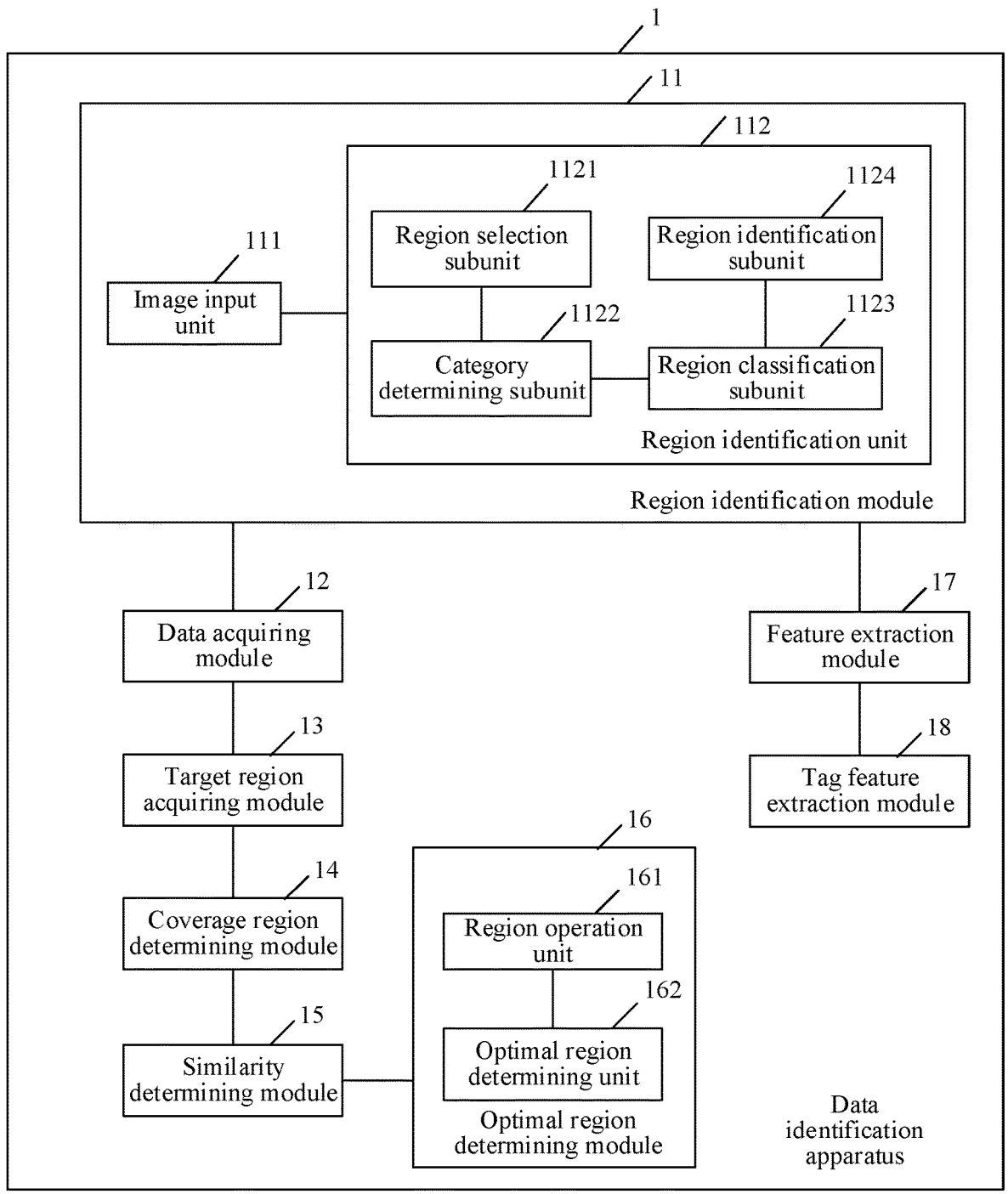
FIG. 8 is a schematic structural diagram of a data identification apparatus according to an embodiment of this disclosure.

Further, FIG. 8 is a schematic structural diagram of a data identification apparatus according to an embodiment of this disclosure. The foregoing data identification apparatus may be a computer program (including program code) running in a computer device. For example, the data identification apparatus is application software. The data identification apparatus may be configured to perform corresponding steps in the method provided in the embodiment corresponding to FIG. 4. The data identification apparatus 1 may include: a region identification module 11, a data acquiring module 12, a target region acquiring module 13, a coverage region determining module 14, a similarity determining module 15, and an optimal region determining module 16.

Herein, the term module (and other similar terms such as unit, submodule, etc.) may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module. A module is configured to perform functions and achieve goals such as those described in this disclosure, and may work together with other related modules, programs, and components to achieve those functions and goals.

The region identification module 11 is configured to acquire a target image;
the region identification module 11 is further configured to identify N prediction regions of a target object in the target image; N being a positive integer;

the data acquiring module 12 is configured to acquire a prediction object category and a prediction object tag feature that are corresponding to a target object in each prediction region;

the target region acquiring module 13 is configured to: acquire a maximum category prediction probability from category prediction probabilities respectively corresponding to the N prediction object categories, and determine a prediction region corresponding to a prediction object category that has the maximum category prediction probability as a first prediction region;

the coverage region determining module 14 is configured to determine a coverage region jointly covered by a second prediction region and the first prediction region; the second prediction region being a prediction region other than the first prediction region in the N prediction regions;

the similarity determining module 15 is configured to determine a tag feature similarity between a prediction object tag feature corresponding to the second prediction region and a prediction object tag feature corresponding to the first prediction region; and the optimal region determining module 16 is configured to determine a target prediction region of the target object in the target image from the N prediction regions according to the coverage region and the tag feature similarity.

For specific implementations of the region identification module 11, the data acquiring module 12, the target region acquiring module 13, the coverage region determining module 14, the similarity determining module 15, and the optimal region determining module 16, references may be made to step S101 to step S106 in the foregoing embodiment corresponding to FIG. 4.

Referring to FIG. 8, the region identification module 11 may include: an image input unit 111 and a region identification unit 112.

The image input unit 111 is configured to input the target image into an image identification model, and output, by using the image identification model, a candidate prediction region corresponding to the target image, an object existence probability corresponding to the candidate prediction region, and an initial category prediction probability corresponding to the candidate prediction region; the object existence probability referring to a probability that an object exists in the candidate prediction region; and the region identification unit 112 is configured to acquire the N prediction regions of the target object in the target image from candidate prediction regions according to the object existence probability and the initial category prediction probability corresponding to the candidate prediction region.

For specific implementations of the image input unit 111 and the region identification unit 112, refer to the description in step S101 in the embodiment corresponding to FIG. 4.

Referring to FIG. 8, the region identification unit 112 may include: a region selection subunit 1121, a category determining subunit 1122, a region classification subunit 1123, and a region identification subunit 1124.

The region selection subunit 1121 is configured to determine a candidate prediction region whose object existence probability is greater than a probability threshold as an intermediate prediction region;

the category determining subunit 1122 is configured to acquire a maximum initial category prediction probability from the initial category prediction probability corresponding to the intermediate prediction region, and determine an object category corresponding to the maximum initial category prediction probability as a prediction object category of an object included in the intermediate prediction region;

the region classification subunit 1123 is configured to perform region classification on intermediate prediction regions according to prediction object categories of objects included in the intermediate prediction regions, to obtain M region sets; prediction object categories of objects included in intermediate prediction regions included in one region set belonging to the same object category; and the region identification subunit 1124 is configured to acquire a target region set from the M region sets, determine an object included in an intermediate prediction region included in the target region set as the target object, and determine intermediate prediction regions included in the target region set as the N prediction regions of the target object in the target image.

For specific implementations of the region selection subunit 1121, the category determining subunit 1122, the region classification subunit 1123, and the region identification subunit 1124, refer to the description in step S101 in the foregoing embodiment corresponding to FIG. 4.

In an embodiment, the data identification apparatus 1 may further include: a feature extraction module 17 and a tag feature extraction module 18.

The feature extraction module 17 is configured to extract a region feature of the candidate prediction region by using the image identification model; and the tag feature extraction module 18 is configured to perform feature extraction on the region feature to obtain a prediction object tag feature corresponding to the candidate prediction region; prediction object tag features corresponding to candidate prediction regions including prediction object tag features respectively corresponding to the N prediction regions.

For specific implementations of the feature extraction module 17 and the tag feature extraction module 18, refer to the description in step S101 in the embodiment corresponding to FIG. 4.

Referring to FIG. 8, the optimal region determining module 16 may include: a region operation unit 161 and an optimal region determining unit 162.

The region operation unit 161 is configured to use a region not covered by the second prediction region and in the first prediction region as a first operation region;

the region operation unit 161 is further configured to use a region not covered by the first prediction region and in the second prediction region as a second operation region;

the region operation unit 161 is further configured to perform addition processing on a region area corresponding to the first operation region and a region area corresponding to the second operation region to obtain a first region area;

the region operation unit 161 is further configured to: acquire a second region area corresponding to the coverage region, and determine an area ratio between the second region area and the first region area; and the optimal region determining unit 162 is configured to determine a target prediction region of the target object in the target image from the N prediction regions according to the area ratio and the tag feature similarity.

For specific implementations of the region operation unit 161 and the optimal region determining unit 162, refer to the foregoing description of step S106 in the embodiment corresponding to FIG. 4.

In an embodiment, the optimal region determining unit 162 is further specifically configured to: when the area ratio is greater than or equal to the proportion threshold and the tag feature similarity is greater than or equal to the similarity threshold, determine the first prediction region in the N prediction regions as the target prediction region of the target object in the target image; and the optimal region determining unit 162 is further specifically configured to: when the area ratio is less than the proportion threshold or the tag feature similarity is less than the similarity threshold, determine both the second prediction region and the first prediction region in the N prediction regions as the target prediction regions of the target object in the target image.

In this embodiment of this disclosure, after the N prediction regions of the target object in the target image are identified, the prediction object category and the prediction object tag feature corresponding to the target object in each prediction region may be acquired. The first prediction region may be acquired from the N prediction regions based on the category prediction probability corresponding to the prediction object category; and when the target prediction region of the target object is selected from the N prediction regions, the target prediction region of the target object in the target image may be jointly determined based on the overlapping region (a coverage region jointly covered) between the second prediction region and the first prediction region and the prediction object tag feature similarity. It is to be understood that the target object may be understood as an object in the target image, and the prediction region may be understood as a detection box of the object. In this application, when determining the final detection box of the target object, in addition to considering the overlapping region between the detection boxes, the prediction object tag feature similarity between the detection boxes is further considered, and the target detection box jointly determined by the two is more accurate. In conclusion, in this application, accuracy of object identification in an image can be improved.

Figure 9:
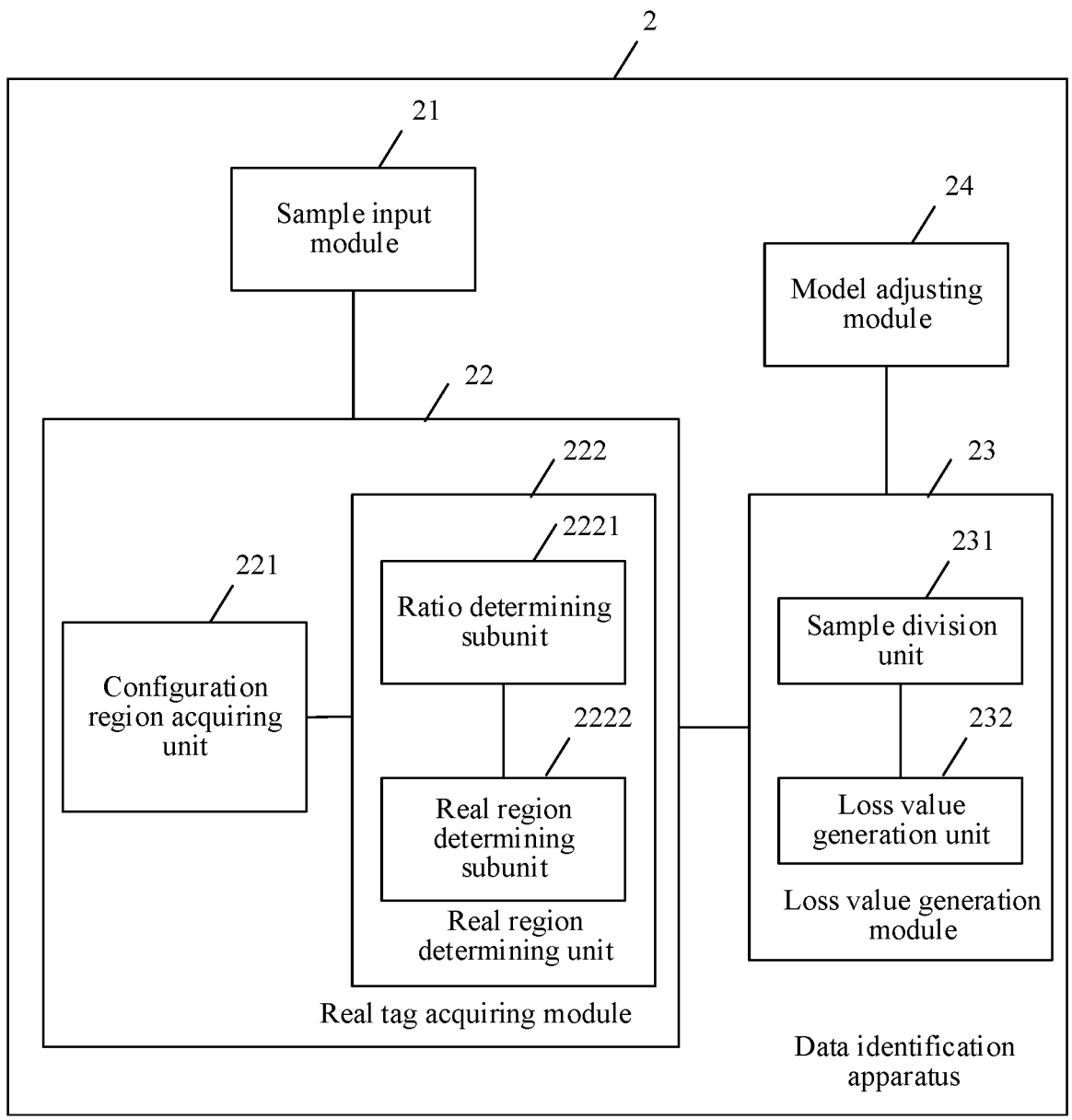
FIG. 9 is a schematic structural diagram of another data identification apparatus according to an embodiment of this disclosure.

FIG. 9 is a schematic structural diagram of another data identification apparatus according to an embodiment of this disclosure. The foregoing data identification apparatus may be a computer program (including program code) running in a computer device. For example, the data identification apparatus is application software. The data identification apparatus may be configured to perform corresponding steps in the method provided in the embodiment corresponding to FIG. 6. The data identification apparatus 2 may include: a sample input module 21, a real tag acquiring module 22, a loss value generation module 23, and a model adjusting module 24.

The sample input module 21 is configured to acquire a sample training image, input the sample training image into a sample image identification model, and output, by using a first convolutional network layer in the sample image identification model, K sample prediction regions of a sample object in the sample training image, a sample prediction object category corresponding to a sample object in each sample prediction region, and a sample object tag feature corresponding to the sample object in each sample prediction region; K being a positive integer;

the real tag acquiring module 22 is configured to acquire a real region corresponding to each sample prediction region;

the real tag acquiring module 22 is further configured to acquire a real object category corresponding to each real region;

the loss value generation module 23 is configured to determine a first loss value according to the K sample prediction regions, the real region corresponding to each sample prediction region, the real object category corresponding to each real region, and the sample prediction object category corresponding to the sample object in each sample prediction region;

the loss value generation module 23 is further configured to determine a second loss value according to the prediction classification result between every two sample object tag features in the K sample object tag features and the real classification result between every two sample object tag features;

the model adjustment module 24 is configured to adjust the sample image identification model according to the first loss value and the second loss value, to obtain the image identification model; the image identification model being used for identifying N prediction regions of a target object in a target image, prediction object categories respectively corresponding to target objects in the N prediction regions, and prediction object tag features corresponding to the target objects in the N prediction regions; the prediction object categories respectively corresponding to the target objects in the N prediction regions and the prediction object tag features respectively corresponding to the target objects in the N prediction regions being used for determining, in the N prediction regions, a target prediction region in which the target object is located; and N being a positive integer.

For specific implementations of the sample input module 21, the real tag acquiring module 22, the loss value generation module 23, and the model adjusting module 24, refer to descriptions of step S201 to step S204 in the foregoing embodiment corresponding to FIG. 6.

In an embodiment, the K sample prediction regions include a sample prediction region $k_i$; and i is a positive integer.

Referring to FIG. 9, the real tag acquiring module 22 may include: a configuration region acquiring unit 221 and a real region determining unit 222.

The configuration region acquiring unit 221 is configured to acquire a candidate configuration real region corresponding to the sample training image;

The configuration region acquiring unit 221 is further configured to determine a sample coverage region jointly covered by the sample prediction region $k_i$ and the candidate configuration real region; and the real region determining unit 222 is configured to acquire a real region corresponding to the sample prediction region $k_i$ from a candidate configuration real region according to the sample coverage region.

For specific implementations of the configuration region acquiring unit 221 and the real region determining unit 222, refer to the foregoing description of step S202 in the embodiment corresponding to FIG. 6.

Referring to FIG. 9, the real region determining unit 222 may include: a ratio determining subunit 2221 and a real region determining subunit 2222.

The ratio determining subunit 2221 is configured to use a region not covered by the sample prediction region $k_i$ and in the candidate configuration real region as a first sample region, and use a region not covered by the candidate configuration real region and in the sample prediction region $k_i$ as a second sample region;

the ratio determining subunit 2221 is further configured to determine a sample area ratio si between the candidate configuration real region and the sample prediction region $k_i$ based on the first sample region, the second sample region, and the sample coverage region; and the real region determining subunit 2222 is configured to: if the sample area ratio si is greater than the area ratio threshold, determine the candidate configuration real region as the real region corresponding to the sample prediction region $k_i$.

For specific implementations of the ratio determining subunit 2221 and the real region determining subunit 2222, refer to the foregoing description of step S202 in the embodiment corresponding to FIG. 6.

In an embodiment, the K sample prediction regions further include a sample prediction region $k_j$; and j is a positive integer. The sample prediction object category corresponding to the sample object in the sample prediction region $k_i$ is determined based on a sample object existence probability and a sample category prediction probability that are of the sample object in the sample prediction region $k_i$ that are outputted by the first convolutional network layer; The sample object existence probability of the sample prediction region $k_i$ refers to a probability that a sample object exists in the sample prediction region $k_i$. The sample prediction object category corresponding to the sample object in the sample prediction region $k_j$ is determined based on a sample object existence probability and a sample category prediction probability that are of the sample object in the sample prediction region $k_j$ that are outputted by the first convolutional network layer; the sample object existence probability of the sample prediction region $k_j$ refers to a probability that a sample object exists in the sample prediction region $k_j$; and the loss value generation module 23 may include: a sample division unit 231 and a loss value generation unit 232.

The sample division unit 231 is configured to: acquire a sample area ratio $s_j$ corresponding to the sample region prediction region $k_j$, determine a sample prediction region whose sample area ratio si and sample area ratio $s_j$ are greater than or equal to an area ratio threshold, as a positive sample region, and determine a sample prediction region whose sample area ratio is less than the area ratio threshold as a negative sample region;

the loss value generation unit 232 is configured to generate a positive sample initial loss value based on the positive sample region, a real region corresponding to the positive sample region, a real object category corresponding to the real region corresponding to the positive sample region, and a sample prediction object category corresponding to a sample object in the positive sample region;

the loss value generation unit 232 is further configured to generate a positive sample confidence loss value according to a sample object existence probability corresponding to the positive sample region;

the loss value generation unit 232 is further configured to generate a negative sample confidence loss value according to a sample object existence probability corresponding to the negative sample region; and the loss value generation unit 232 is further configured to perform addition processing on the positive sample initial loss value, the positive sample confidence loss value, and the negative sample confidence loss value to obtain the first loss value.

In an embodiment, the loss value generation unit 232 is further specifically configured to determine a region loss value according to the real region corresponding to the positive sample region and the positive sample region;

the loss value generation unit 232 is further specifically configured to determine a category loss value according to the sample prediction object category of the sample object in the positive sample region and the real object category corresponding to the real region corresponding to the positive sample region; and the loss value generation unit 232 is further specifically configured to perform addition processing on the region loss value and the category loss value to obtain the positive sample initial loss value.

In an embodiment, the K sample prediction regions include a first sample prediction region and a second sample prediction region; and the K sample object tag features include a first sample object tag feature corresponding to the first sample prediction region and a second sample object tag feature corresponding to the second sample prediction region. The first sample prediction region and the second sample prediction region belong to the positive sample region;

the loss value generation unit 232 is further specifically configured to input the first sample object tag feature and the second sample object tag feature to a second convolutional network layer, and perform feature classification on the first sample object tag feature and the second sample object tag feature by using the second convolutional network layer, to obtain a prediction classification result between the first sample object tag feature and the second sample object tag feature;

the loss value generation unit 232 is further specifically configured to determine a real classification result between the first sample object tag feature and the second sample object tag feature according to a real object category corresponding to a real region corresponding to the first sample prediction region and a real object category corresponding to a real region corresponding to the second sample prediction region; and the loss value generation unit 232 is further specifically configured to determine a second loss value according to the prediction classification result between the first sample object tag feature and the second sample object tag feature, and the real classification result between the first sample object tag feature and the second sample object tag feature.

In this embodiment of this disclosure, a sample image identification model is trained by using a sample training image, so that the sample image identification model can accurately identify a prediction region of a target object in a target image, a prediction object category of the target object included in the prediction region, and a prediction object tag feature of the target object included in the prediction region. Further, an accurate target prediction region of the target object can be determined based on an accurate prediction region, prediction object category, and prediction object tag feature. Accuracy of object identification in an image can be improved.

Figure 10:
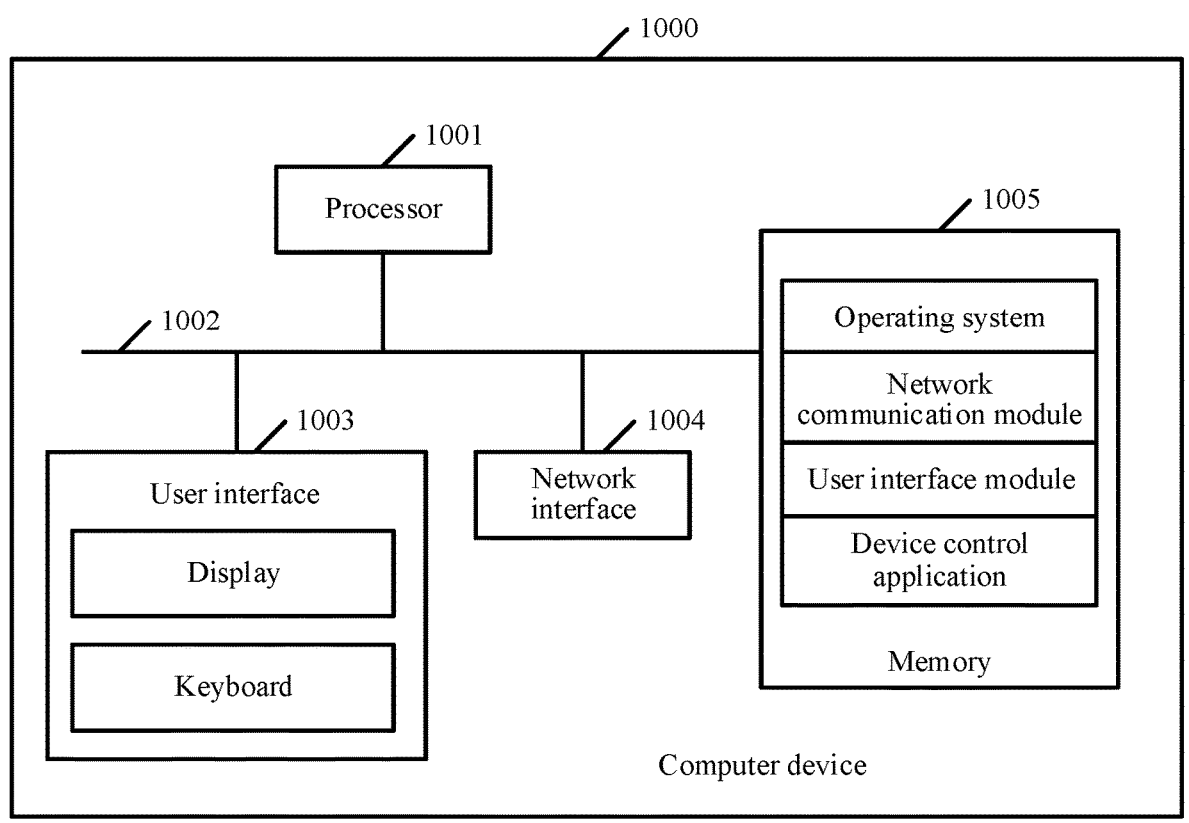
FIG. 10 is a schematic structural diagram of a computer device according to an embodiment of this disclosure.

Further, FIG. 10 is a schematic structural diagram of a computer device according to an embodiment of this disclosure. As shown in FIG. 10, the data identification apparatus 1 in the foregoing embodiment corresponding to FIG. 8 or the data identification apparatus 2 in the embodiment corresponding to FIG. 9 may be applied to the foregoing computer device 1000. The foregoing computer device 1000 may include: a processor 1001, a network interface 1004, and a memory 1005. In addition, the foregoing computer device 1000 further includes: a user interface 1003 and at least one communications bus 1002. the communication bus 1002 is configured to implement connection and communication between these components. The user interface 1003 may include a display and a keyboard. The user interface 1003 may further include a standard wired interface and wireless interface. The network interface 1004 may include a standard wired interface and wireless interface (for example, a Wi-Fi interface). The memory 1005 may be a high-speed RAM memory, or may be a non-volatile memory, for example, at least one magnetic disk memory. The memory 1005 may be at least one storage apparatus that is located far away from the foregoing processor 1001. As shown in FIG. 10, the memory 1005 used as a computer readable storage medium may include an operating system, a network communication module, a user interface module, and a device-control application program.

In the computer device 1000 shown in FIG. 10, the network interface 1004 may provide a network communication function. The user interface 1003 is mainly configured to provide an input interface for a user. The processor 1001 may be configured to invoke the device-control application program stored in the memory 1005 to implement the steps in the foregoing embodiment shown in FIG. 4 or FIG. 6.

It is to be understood that the computer device 1000 described in this embodiment of this disclosure may perform the foregoing description of the data identification method in the embodiment corresponding to FIG. 4 or FIG. 6, or may perform the foregoing description of the data identification apparatus 1 in the embodiment corresponding to FIG. 8, or the foregoing description of the data identification apparatus 2 in the embodiment corresponding to FIG. 9.

In addition, an embodiment of this disclosure further provides a computer readable storage medium. The computer readable storage medium stores a computer program executed by the computer device 1000 that processes data mentioned above, and the computer program includes program instructions. When the processor executes the program instructions, the processor can execute the foregoing description of the data identification method in the embodiment corresponding to FIG. 4 or FIG. 6. For technical details that are not disclosed in the computer readable storage medium embodiments of this disclosure, refer to the descriptions of the method embodiments of this disclosure.

The foregoing computer readable storage medium may be the data identification apparatus provided in any one of the foregoing embodiments or an internal storage unit of the foregoing computer device, such as a hard disk or a memory of the computer device. The computer readable storage medium may also be an external storage device of the computer device, for example, a plug type hard disk, a smart media card (SMC), a secure digital (SD) card, and a flash card that are configured on the computer device. Further, the computer readable storage medium may further include an internal storage unit of the computer device and an external storage device. The computer readable storage medium is configured to store the computer program and other programs and data required by the computer device. The computer readable storage medium may be further configured to temporarily store data that has been or is to be output.

An aspect of this application provides a computer program product or a computer program, the computer program product or the computer program including computer instructions, the computer instructions being stored in a computer readable storage medium. A processor of a computer device reads the computer instructions from the computer readable storage medium, and the processor executes the computer instructions, so that the computer device performs the method provided in the aspect of the embodiments of this disclosure.

The terms "first" and "second" in the specification, claims, and accompanying drawings of the embodiments of this disclosure are used for distinguishing between different objects, and are not used for describing a specific sequence. In addition, the term "include" and any variant thereof are intended to cover a non-exclusive inclusion. For example, a process, method, apparatus, product, or device that includes a series of steps or units is not limited to the listed steps or modules; and instead, further includes a step or module that is not listed, or further includes another step or unit that is intrinsic to the process, method, apparatus, product, or device.

A person of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are executed in a mode of hardware or software depends on particular applications and design constraint conditions of the technical solutions. Those skilled in the art may use different methods to implement the described functions for each particular application, but such implementation is not to be considered beyond the scope of this application.

The method and the related apparatus provided in the embodiments of this disclosure are described with reference to a flowchart and/or a schematic structural diagram of the method provided in the embodiments of this disclosure. Specifically, each process and/or block of the method flowchart and/or the schematic structural diagram of the method may be implemented by a computer program instruction, and a combination of the process and/or block in the flowchart and/or block diagram. These computer program instructions may be provided to a general-purpose computer, a dedicated computer, an embedded processor, or a processor of another programmable data processing device to generate a machine, so that the instructions executed by the computer or the processor of the another programmable data processing device generate an apparatus for implementing a specific function in one or more processes in the flowcharts and/or in one or more blocks in the schematic structural diagram. These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the schematic structural diagram. These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the schematic structural diagram.

What is disclosed above is merely optional embodiments of this disclosure, and certainly is not intended to limit the scope of the claims of this application. Therefore, equivalent variations made in accordance with the claims of this application shall fall within the scope of this application.

What is claimed is:

1. A data identification method, comprising:
acquiring a first prediction region in a target image, the first prediction region being a prediction region corresponding to a maximum prediction category probability in N prediction regions in the target image, a prediction category probability being a probability that an object in a prediction region belongs to a prediction object category, and prediction object categories of objects comprised in the N prediction regions being the same; N being a positive integer greater than 1;
determining a coverage region jointly covered by a second prediction region and the first prediction region; the second prediction region being a prediction region other than the first prediction region in the N prediction regions; and
determining a target prediction region in the N prediction regions based on an area of the coverage region and a similarity associated with the second prediction region, the similarity being for indicating a similarity between an object in the second prediction region and an object in the first prediction region, and the target prediction region being a region in which an object of the target image is located.

2. The method according to claim 1, wherein the acquiring the first prediction region in the target image comprises:
acquiring the target image and identifying the N prediction regions in the target image;
acquiring a prediction object category corresponding to an object in each of the N prediction regions, to obtain N prediction object categories; and
acquiring a maximum category prediction probability from category prediction probabilities respectively corresponding to the N prediction object categories, and determining a prediction region corresponding to a prediction object category that has the maximum category prediction probability as the first prediction region.

3. The method according to claim 2, wherein the identifying the N prediction regions in the target image comprises:
inputting the target image into an image identification model, and outputting, with the image identification model, a candidate prediction region corresponding to the target image, an object existence probability corresponding to the candidate prediction region, and an initial prediction probability corresponding to the candidate prediction region, the object existence probability being a probability that an object exists in the candidate prediction region; and
acquiring the N prediction regions from multiple candidate prediction regions based on the object existence probability and the initial prediction probability corresponding to the candidate prediction region.

4. The method according to claim 3, wherein the acquiring the N prediction regions from multiple candidate prediction regions based on the object existence probability and the initial prediction probability corresponding to the candidate prediction region comprises:
determining a candidate prediction region whose object existence probability is greater than a probability threshold as an intermediate prediction region;
determining a maximum initial prediction probability from the initial prediction probability corresponding to the intermediate prediction region, and determining an object category corresponding to the maximum initial prediction probability as a prediction object category of an object in the intermediate prediction region;
performing region classification on multiple intermediate prediction regions based on prediction object categories of objects in the intermediate prediction regions, to obtain M region sets, prediction object categories of objects in the intermediate prediction regions comprised in a same region set belonging to a same object category, and M being a positive integer; and
acquiring a target region set from the M region sets, and determining intermediate prediction regions comprised in the target region set as the N prediction regions.

5. The method according to claim 3, wherein the method further comprises:
extracting a region feature of the candidate prediction region using the image identification model; and
performing feature extraction on the region feature to obtain a prediction object tag feature corresponding to the candidate prediction region, prediction object tag features corresponding to multiple candidate prediction regions comprising prediction object tag features respectively corresponding to the N prediction regions.

6. The method according to claim 1, wherein the method further comprises:
for each of the prediction regions, acquiring a prediction object tag feature for the prediction region, the prediction object tag feature being a tag feature of an object in the prediction region; and
determining a tag feature similarity between a prediction object tag feature for the second prediction region and a prediction object tag feature for the first prediction region, to obtain the similarity associated with the second prediction region.

7. The method according to claim 1, wherein the determining the target prediction region in the N prediction regions based on the area of the coverage region and the similarity associated with the second prediction region comprises:
for each of second prediction regions, determining an intersection over union corresponding to the second prediction region based on the area of the coverage region, the intersection over union being a ratio between the area of the coverage region and an area of a non-coverage region, and the non-coverage region being a region other than the coverage region in the first prediction region and the second prediction region; and
determining the target prediction region from the N prediction regions based on intersection over unions respectively corresponding to each of the second prediction regions and similarities respectively associated with each of the second prediction regions.

8. The method according to claim 7, wherein the determining the intersection over union corresponding to the second prediction region based on the area of the coverage region comprises:
using a region not covered by the second prediction region and in the first prediction region as a first operation region;

using a region not covered by the first prediction region and in the second prediction region as a second operation region;

performing addition processing on a region area corresponding to the first operation region and a region area corresponding to the second operation region to obtain a first region area; and acquiring a second region area corresponding to the coverage region, and determining an area ratio between the second region area and the first region area, to obtain the intersection over union corresponding to the second prediction region.

9. The method according to claim 7, wherein the determining the target prediction region from the N prediction regions based on the intersection over unions respectively corresponding to each of the second prediction regions and the similarities respectively corresponding to each of the second prediction regions comprises:

determining the first prediction region as the target prediction region in response to each of the intersection over unions being greater than or equal to a proportion threshold, and each of the similarities is greater than or equal to a similarity threshold.

10. The method according to claim 9, wherein the determining the target prediction region from the N prediction regions based on the intersection over unions respectively corresponding to each of the second prediction regions and the similarities respectively corresponding to each of the second prediction regions comprises:

for each of the second prediction regions, determining both the second prediction region and the first prediction region as the target prediction regions in response to the intersection over union corresponding to the second prediction region being less than the proportion threshold, or a similarity corresponding to the second prediction region being less than the similarity threshold.

11. A data identification method, comprising:

determining, with a sample image identification model and based on a sample training image, K sample prediction regions in the sample training image, a sample prediction object category corresponding to a sample object in a sample prediction region, and a prediction classification result between every two sample object tag features in K sample object tag features, the K sample object tag features being sample object tag features corresponding to sample objects in the K sample prediction regions, and K being a positive integer;

acquiring a real region corresponding to the sample prediction region and a real object category corresponding to the real region; and adjusting the sample image identification model to obtain an image identification model based on the K sample prediction regions, the real region corresponding to the sample prediction region, the real object category corresponding to the real region, the sample prediction object category corresponding to the sample object in the sample prediction region, and the prediction classification result and a real classification result between every two sample object tag features in the K sample object tag features, the image identification model being for identifying N prediction regions in a target image, prediction object categories corresponding to objects in the N prediction regions, and prediction object tag features respectively corresponding to each of the N prediction regions, the N prediction regions, the prediction object categories corresponding to the objects in the N prediction regions, and the prediction object tag features respectively corresponding to each of the N prediction regions being for determining a target prediction region in the N prediction regions, and prediction object categories corresponding to the N prediction regions being the same, and N being a positive integer greater than 1.

12. The method according to claim 11, wherein the determining the K sample prediction regions in the sample training image, the sample prediction object category, and the prediction classification result comprises:

acquiring the sample training image, inputting the sample training image into the sample image identification model, and determining, with a first convolutional network layer in the sample image identification model, the K sample prediction regions, the sample prediction object category corresponding to the sample object in the sample prediction region, and a sample object tag feature corresponding to the sample prediction region; and inputting the K sample object tag features into a second convolutional network layer in the sample image identification model, and outputting, with the second convolutional network layer, the prediction classification result between every two sample object tag features in the K sample object tag features.

13. The method according to claim 11, wherein the adjusting the sample image identification model comprises:

determining a first loss value based on the K sample prediction regions, the real region corresponding to the sample prediction region, the real object category corresponding to the real region, and the sample prediction object category corresponding to the sample object in the sample prediction region;

determining a second loss value based on the prediction classification result between every two sample object tag features in the K sample object tag features and the real classification result between every two sample object tag features; and adjusting the sample image identification model based on the first loss value and the second loss value, to obtain the image identification model.

14. The method according to claim 13, wherein the K sample prediction regions comprise a positive sample region and a negative sample region, and the determining the first loss value comprises:

generating a positive sample initial loss value based on the positive sample region, a real region corresponding to the positive sample region, a real object category corresponding to the real region corresponding to the positive sample region, and a sample prediction object category corresponding to a sample object in the positive sample region;

generating a positive sample confidence loss value based on a sample object existence probability corresponding to the positive sample region;

generating a negative sample confidence loss value based on a sample object existence probability corresponding to the negative sample region; and performing addition processing on a positive sample initial loss value corresponding to the positive sample region, the positive sample confidence loss value corresponding to the positive sample region, and the negative sample confidence loss value corresponding to the negative sample region, to obtain the first loss value.

15. The method according to claim 14, wherein the generating the positive sample initial loss value comprises:
   determining a region loss value based on the real region corresponding to the positive sample region and the positive sample region;
   determining a category loss value based on the sample prediction object category of the sample object in the positive sample region and the real object category corresponding to the real region corresponding to the positive sample region; and
   performing addition processing on the region loss value and the category loss value to obtain the positive sample initial loss value.

16. The method according to claim 14, wherein the K sample prediction regions comprise a first sample prediction region and a second sample prediction region; the K sample object tag features comprise a first sample object tag feature corresponding to the first sample prediction region and a second sample object tag feature corresponding to the second sample prediction region, the first sample prediction region and the second sample prediction region belong to the positive sample region, and the method further comprises:
   determining a real classification result between the first sample object tag feature and the second sample object tag feature based on a real object category of a real region corresponding to the first sample prediction region and a real object category of a real region corresponding to the second sample prediction region.

17. The method according to claim 11, wherein the K sample prediction regions comprise a sample prediction region $k_i$; i is a positive integer, and the acquiring the real region corresponding to the sample prediction region comprises:
   acquiring a candidate configuration real region corresponding to the sample training image;
   determining a sample coverage region jointly covered by the sample prediction region $k_i$ and the candidate configuration real region; and
   acquiring a real region corresponding to the sample prediction region $k_i$ from at least one candidate configuration real region based on an area of the sample coverage region.

18. The method according to claim 17, wherein the acquiring the real region corresponding to the sample prediction region $k_i$ from the at least one candidate configuration real region based on the area of the sample coverage region comprises:
   determining a sample intersection over union corresponding to the candidate configuration real region based on the area of the sample coverage region, the sample intersection over union being a ratio of the area of the sample coverage region to an area of a non-sample coverage region, and the non-sample coverage region being a region other than the sample coverage region in the candidate configuration real region and the sample prediction region $k_i$; and
   determining the candidate configuration real region as the real region corresponding to the sample prediction region $k_i$ in response to the sample intersection over union corresponding to the candidate configuration real region being greater than an area ratio threshold.

19. The method according to claim 18, wherein the determining the sample intersection over union corresponding to the candidate configuration real region based on the area of the sample coverage region comprises:
   using a region not covered by the sample prediction region $k_i$ and in the candidate configuration real region as a first sample region, and using a region not covered by the candidate configuration real region and in the sample prediction region $k_i$ as a second sample region; and
   determining a sample area ratio si between the candidate configuration real region and the sample prediction region $k_i$ based on the first sample region, the second sample region, and the sample coverage region, and using the sample area ratio si as the sample intersection over union corresponding to the candidate configuration real region.

20. A data identification apparatus, comprising:
   a memory operable to store computer-readable instructions; and
   a processor circuitry operable to read the computer-readable instructions, the processor circuitry when executing the computer-readable instructions is configured to:
      acquire a first prediction region in a target image, the first prediction region being a prediction region corresponding to a maximum prediction category probability in N prediction regions in the target image, a prediction category probability being a probability that an object in a prediction region belongs to a prediction object category, and prediction object categories of objects comprised in the N prediction regions being the same, N being a positive integer greater than 1;
      determine a coverage region jointly covered by a second prediction region and the first prediction region; the second prediction region being a prediction region other than the first prediction region in the N prediction regions; and
      determine a target prediction region in the N prediction regions based on an area of the coverage region and a similarity associated with the second prediction region, the similarity being for indicating a similarity between an object in the second prediction region and an object in the first prediction region, and the target prediction region being a region in which an object of the target image is located.

* * * * *